United States Patent
Yoon et al.

(10) Patent No.: US 9,344,245 B2
(45) Date of Patent: *May 17, 2016

(54) APPARATUS AND METHOD FOR ALLOCATING CHANNEL STATE INFORMATION-REFERENCE SIGNAL IN WIRELESS COMMUNICATION SYSTEM

(71) Applicant: PANTECH CO., LTD., Seoul (KR)

(72) Inventors: Sungjun Yoon, Seoul (KR); Kyoung-min Park, Goyang-si (KR); Kitae Kim, Suwon-si (KR)

(73) Assignee: Pantech Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/299,679

(22) Filed: Jun. 9, 2014

(65) Prior Publication Data

US 2014/0286304 A1  Sep. 25, 2014

Related U.S. Application Data

(63) Continuation of application No. 13/149,225, filed on May 31, 2011, now Pat. No. 8,787,216.

(30) Foreign Application Priority Data

Jun. 1, 2010 (KR) .................. 10-2010-0052033
Jun. 10, 2010 (KR) .................. 10-2010-0055073

(51) Int. Cl.
*H04J 3/16* (2006.01)
*H04L 5/14* (2006.01)
(Continued)

(52) U.S. Cl.
CPC .............. *H04L 5/005* (2013.01); *H04L 5/0007* (2013.01); *H04L 5/0039* (2013.01); *H04L 5/0048* (2013.01)

(58) Field of Classification Search
CPC .......... H04J 1/00; H04J 11/00; H04W 72/04; H04L 5/1469
USPC ......... 370/203–210, 281, 294, 468, 329–332, 370/280, 344; 375/295, 340, 267, 316, 324
See application file for complete search history.

(56) References Cited

U.S. PATENT DOCUMENTS 6,473,467 B1  10/2002  Wallace et al.
8,340,199 B2  12/2012  Nam et al.
(Continued)

OTHER PUBLICATIONS

International Search Report for corresponding PCT Application No. PCT/KR2011/003988 mailed Dec. 26, 2011, pp. 1-6.

(Continued)

*Primary Examiner* — Hanh N Nguyen
(74) *Attorney, Agent, or Firm* — H.C. Park & Associates, PLC

(57) ABSTRACT

Embodiments of the present invention relate to a wireless communication system, and more particularly, to a technology for allocating a Channel State Information-Reference Signal (CSI-RS) in a wireless communication system. Embodiments of the present invention provides an apparatus and method for allocating CSI-RSs to resource areas, in which, under the condition of a subframe in which the CP is an extended CP, and the duplex scheme is TDD, if CSI-RSs for maximum 8 antenna ports are allocated, the CSI-RSs are allocated to the 8th and 9th symbols (symbol No. l=7 and 8), wherein each CSI-RS for every two antenna ports is allocated to the same RE while being discriminated from each other by an orthogonal code and neighbor CSI-RS allocated REs in the frequency axis are spaced by an interval of three REs.

20 Claims, 16 Drawing Sheets

(51) Int. Cl.
*H04J 11/00* (2006.01)
*H04L 5/00* (2006.01)

(56) References Cited

U.S. PATENT DOCUMENTS

| | | | |
|---|---|---|---|
| 8,787,216 B2* | 7/2014 | Yoon et al. | 370/281 |
| 2005/0232156 A1 | 10/2005 | Kim et al. | |
| 2008/0070564 A1 | 3/2008 | Li et al. | |
| 2009/0207799 A1 | 8/2009 | Mazzarese | |
| 2011/0176634 A1 | 7/2011 | Yoon et al. | |
| 2011/0199986 A1* | 8/2011 | Fong et al. | 370/329 |
| 2012/0063386 A1* | 3/2012 | Park et al. | 370/315 |
| 2012/0120842 A1 | 5/2012 | Kim et al. | |
| 2012/0230231 A1 | 9/2012 | Lim et al. | |

OTHER PUBLICATIONS

Written Opinion for corresponding PCT Application No. PCT/KR2011/003988 mailed Dec. 26, 2011, pp. 1-5.

3GPP TS 36.211 V9.1.0, 3rd Generation Partnership Project; Technical Specification Group Radio Access Network; Evolved Universal Terrestrial Radio Access (E-UTRA); Physical Channels and Modulation, Release 9, Mar. 2010.

Non-Final Office Action in U.S. Appl. No. 13/149,225 mailed Aug. 9, 2013.

Notice of Allowance in U.S. Appl. No. 13/149,225 mailed Mar. 7, 2014.

* cited by examiner

APPARATUS AND METHOD FOR ALLOCATING CHANNEL STATE INFORMATION-REFERENCE SIGNAL IN WIRELESS COMMUNICATION SYSTEM

CROSS-REFERENCE TO RELATED APPLICATIONS

This application is a continuation of U.S. patent application Ser. No. 13/149,225, filed on May 31, 2011, all of which claims priority from and the benefit under 35 U.S.C. §119(a) of Korean Patent Application No. 10-2010-0052033 filed on Jun. 1, 2010 and Korean Patent Application No. 10-2010-0055073 filed on Jun. 10, 2010, which are hereby incorporated by reference for all purposes as if fully set forth herein.

BACKGROUND

1. Field

Embodiments of the present invention relate to a wireless communication system, and more particularly, to a technology for allocating a Channel State Information-Reference Signal (CSI-RS) in a wireless communication system.

2. Discussion of the Background

With the development of communication systems, a wide variety of wireless terminals are being used by consumers, such as business companies and individuals.

Mobile communication systems, such as 3GPP (3rd Generation Partnership Project) including LTE (Long Term Evolution) and LTE-A (LTE Advanced), allow for the development of technology for a high-speed large-capacity communication system, which can transmit or receive various data, such as images and wireless data, beyond the capability of providing a voice service, and can transmit data of such a large capacity as that transmitted in a wired communication network. Moreover, the current mobile communication systems are requiring a proper error detection scheme, which has a goal to minimize the reduction of information loss and improve the system transmission efficiency, thereby improving the system performance.

Further, in various current communication systems, various Reference Signals (RSs) are used in order to provide information of a communication environment, etc. to a counterpart device through an uplink or a downlink.

For example, in a Long Term Evolution (LTE) system, which is an evolved system for mobile communication, a Cell-specific Reference Signal (CRS) is transmitted as a reference signal at each sub-frame in order to obtain channel information in the downlink transmission.

At this time, since the maximum number of antennas supportable in the downlink of the LTE system is four, different CRSs are allocated to and transmitted through a maximum of four antenna ports according to the time/frequency.

The next generation communication technologies, such as the LTE-A, can support eight antennas in the downlink. Therefore, the current CRSs defined for four existing antennas are insufficient for detection of channel information at the time of downlink transmission. In order to overcome such a problem, a reference signal named "Channel State Information-Reference Signal (CSI-RS)" has been newly defined to obtain channel state information of a maximum of eight antennas.

In other words, a communication system using a maximum of eight Multiple Input Multiple Output (MIMO) antennas at both the transmission port and the reception port may be used, and a scheme of transmitting CSI-RSs, UEs of which are different according to the antenna ports or antenna layers for the transmission or reception of the signals, may also be used. Presently, only basic definitions for the CSI-RS and definitions for the resource overhead have been arranged. However, methods for allocating corresponding CSI-RS patterns to resource areas by each antenna port in each eNB (or eNodeB) or cell have not been specifically arranged yet.

Especially, the length of the Cyclic Prefix (CP), Duplex scheme, etc. may change the form or type of the subframe to which the CSI-RSs will be allocated. However, there has been no discussion about a scheme for allocating CSI-RSs to each antenna port in such a case.

SUMMARY

Additional features of the invention will be set forth in the description which follows, and in part will be apparent from the description, or may be learned by practice of the invention.

An exemplary embodiment of the present invention discloses an apparatus or a method for allocating Channel State Information-Reference Signals (CSI-RSs) for maximum 8 antenna ports to resource areas including a plurality of Resource Elements (REs), under a condition of a subframe in which an extended Cyclic Prefix (CP) is employed as a CP, a Time Division Duplex (TDD) scheme is employed as a duplex scheme, wherein the CSI-RSs are allocated to 8th and 9th symbols (symbol number $l=7$ and 8), each CSI-RS for every two antenna ports is allocated to an identical RE while being discriminated from each other by an orthogonal code, and neighbor CSI-RS allocated REs in the frequency axis are spaced by an interval of three REs. The other exemplary embodiment of the present invention discloses an apparatus for receiving Channel State Information-Reference Signals (CSI-RSs), the apparatus comprising: a signal receiver for receiving an Orthogonal Frequency Division Multiplexing (OFDM) signal, which is generated through allocation of CSI-RSs for maximum 8 antenna ports, under a condition of a subframe in which an extended Cyclic Prefix (CP) is employed as a CP, a Time Division Duplex (TDD) scheme is employed as a duplex scheme; a CSI-RS extractor for extracting CSI-RSs for each of the multiple antenna ports allocated to particular REs from a signal received by the signal receiver; and a channel state measurer for acquiring Channel State Information (CSI) based on the extracted CSI-RSs, wherein the CSI-RSs are allocated to 8th and 9th symbols (symbol number $l=7$ and 8) when the CSI-RSs are allocated to maximum 8 antenna ports, each CSI-RS for every two antenna ports is allocated to an identical RE while being discriminated from each other by an orthogonal code, and neighbor CSI-RS allocated REs in the frequency axis are spaced by an interval of three REs.

The other exemplary embodiment of the present invention discloses a method for receiving Channel State Information-Reference Signals (CSI-RSs), the method comprising the steps of: receiving an Orthogonal Frequency Division Multiplexing (OFDM) signal, which is generated through allocation of CSI-RSs for maximum 8 antenna ports, under a condition of a subframe in which an extended Cyclic Prefix (CP) is employed as a CP, a Time Division Duplex (TDD) scheme is employed as a duplex scheme; extracting CSI-RSs for each of the multiple antenna ports allocated to particular REs from the received signal; and acquiring Channel State Information (CSI) based on the extracted CSI-RSs, wherein the CSI-RSs are allocated to 8th and 9th symbols (symbol number $l=7$ and 8) when the CSI-RSs are allocated to maximum 8 antenna ports, each CSI-RS for every two antenna ports is allocated to an identical RE while being discriminated from each other by an orthogonal code, and neighbor CSI-RS allocated REs in the frequency axis are spaced by an interval of three REs.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
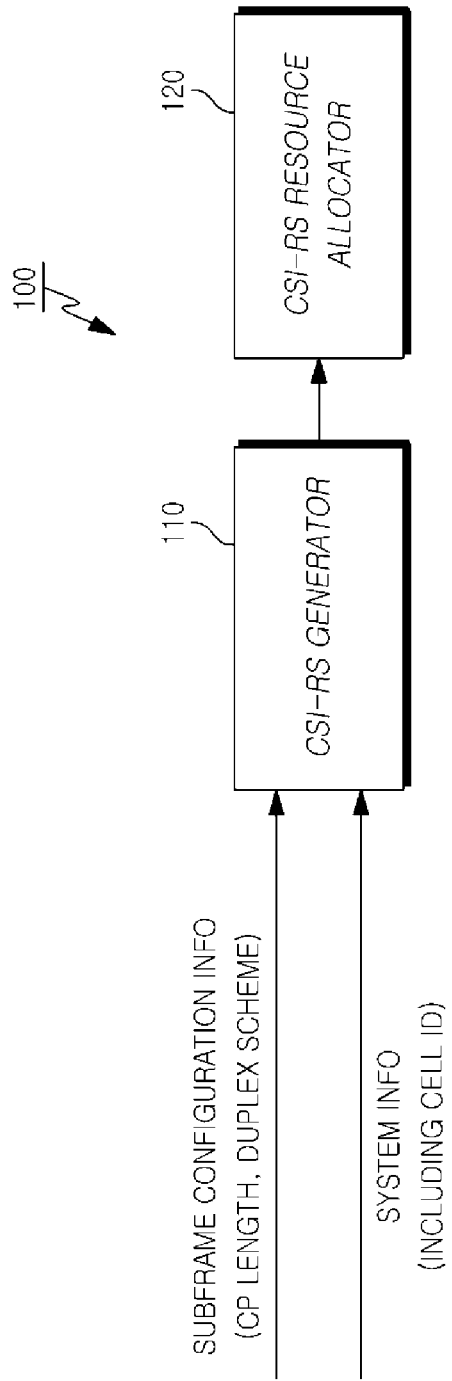
FIG. 1 is a block diagram illustrating a structure of a CSI-RS allocation apparatus according to an exemplary embodiment of the present invention.

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. Various changes, modifications, and equivalents of the systems, apparatuses, and/or methods described herein will likely suggest themselves to those of ordinary skill in the art. Elements, features, and structures are denoted by the same reference numerals throughout the drawings and the detailed description, and the size and proportions of some elements may be exaggerated in the drawings for clarity and convenience.

An embodiment of the present invention provides an apparatus to allocate Channel State Information-Reference Signals (CSI-RSs) to time-frequency resource areas for each antenna port in a wireless communication system. An embodiment also provides a method for allocating Channel State Information-Reference Signals (CSI-RSs) to time-frequency resource areas for each antenna port in a wireless communication system.

Another embodiment of the present invention provides an apparatus for allocating CSI-RSs to resource areas, so as to enable each cell to have the orthogonality. An embodiment also provides a method for allocating CSI-RSs to resource areas, so as to enable each cell to have the orthogonality.

Another embodiment of the present invention provides an apparatus for allocating CSI-RSs to resource areas, so as to enable each cell to have the orthogonality according to the type of each subframe to which the CSI-RSs will be allocated.

An embodiment also provides a method for allocating CSI-RSs to resource areas, so as to enable each cell to have the orthogonality according to the type of each subframe to which the CSI-RSs will be allocated.

Another embodiment of the present invention provides an apparatus for allocating CSI-RSs to resource areas, so as to enable each cell to have the orthogonality, according to whether it is possible to duplicately allocate a CSI-RS to a reference signal allocated area of a legacy communication system. An embodiment also provides a method for allocating CSI-RSs to resource areas, so as to enable each cell to have the orthogonality, according to whether it is possible to duplicately allocate a CSI-RS to a reference signal allocated area of a legacy communication system.

Another embodiment of the present invention provides an apparatus for allocating CSI-RSs to resource areas, so as to enable each cell to have the orthogonality, according to whether it is possible to allocate a CSI-RS to resource areas allocated for antenna port 5 (AP5) and in consideration of the subframe structure information including the CP length, Duplex scheme, and the number of symbols allocated to the downlink (DwPTS) within a special subframe in the case of TDD. An embodiment also provides a method for allocating CSI-RSs to resource areas, so as to enable each cell to have the orthogonality, according to whether it is possible to allocate a CSI-RS to resource areas allocated for antenna port 5 (AP5) and in consideration of the subframe structure information including the CP length, Duplex scheme, and the number of symbols allocated to the downlink (DwPTS) within a special subframe in the case of TDD.

Another embodiment of the present invention provides an apparatus for allocating CSI-RSs to resource areas, in which, under the condition of a subframe in which the CP is an extended CP, and the duplex scheme is TDD, if CSI-RSs for maximum 8 antenna ports are allocated, the CSI-RSs are allocated to the $8^{th}$ and $9^{th}$ symbols (symbol No. l=7 and 8), wherein each CSI-RS for every two antenna ports is allocated to the same RE while being discriminated from each other by an orthogonal code and neighbor CSI-RS allocated REs in the frequency axis are spaced by an interval of three REs. An embodiment also provides a method for allocating CSI-RSs to resource areas, in which, under the condition of a subframe in which the CP is an extended CP, and the duplex scheme is TDD, if CSI-RSs for 8 antenna ports are allocated, the CSI-RSs are allocated to the $8^{th}$ and $9^{th}$ symbols (symbol No. l=7 and 8), wherein CSI-RSs for every two antenna ports is allocated to the same RE while being discriminated from each other by an orthogonal code and neighbor CSI-RS allocated REs in the frequency axis are spaced by an interval of three REs.

Wireless communication systems in the exemplary embodiments are widely arranged in order to provide various communication services, such as voice, packet data, etc.

A wireless communication system according to the exemplary embodiments includes a UE (User Equipment) and a eNodeB (or BS (Base Station)). A technology capable of satisfying an overhead and which may minimize the interference between cells or antenna ports by using the CSI-RS allocation or mapping as described hereinafter is applied to the UE and the eNodeB, which will be described below in more detail with reference to FIG. 1.

As used herein, the UE may refer to a user terminal in a wireless communication system, such as a UE in WCDMA, LTE, HSPA (High Speed Packet Access), an MS (Mobile Station), a UT (User Terminal), SS (Subscriber Station), and a wireless device in GSM (Global System for Mobile Communication).

The eNodeB or cell generally refers to any device, function, or particular area capable of communicating with the UE, and may be called by another name, such as Node-B, sector, site, BTS (Base Transceiver System), AP (Access Point), or relay node.

That is, as used herein, the eNodeB or cell may have a meaning indicating an area controlled by a BSC (Base Station Controller) of the CDMA, a Node B of the WCDMA, or an area or function covered by a sector or eNodeB (or site) in the LTE, and may correspond to one of various coverage areas, which include a mega cell, a macro cell, a micro cell, a pico cell, femto cell, a relay node communication range, etc.

Various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, and OFDM-CDMA, may be applied to the wireless communication system.

For the uplink transmission and the downlink transmission, it is possible to use either a TDD (Time Division Duplex) scheme using different times for transmission or an FDD (Frequency Division Duplex) scheme using different frequencies for transmission.

A wireless communication system may support uplink and/or downlink HARQ and can use a Channel Quality Indicator (CQI) for link adaptation. Further, different multiple access schemes may be used for downlink transmission and uplink transmission. For example, an Orthogonal Frequency Division Multiple Access (OFDMA) scheme may be used for the downlink, while a Single Carrier-Frequency Division Multiple Access (SC-FDMA) scheme is used for the uplink.

In an exemplary wireless communication system to which embodiments of the present invention are applied, one radio frame or wireless frame includes 10 sub-frames and one sub-frame may include two slots.

The basic unit for data transmission is a sub-frame, and downlink or uplink scheduling is performed by the unit of sub-frame. One slot may include a plurality of OFDM symbols in the time axis and a plurality of sub-carriers in the frequency axis. Specifically, one slot may include 7 or 6 OFDM symbols.

For example, if one sub-frame includes two time slots, each time slot may include 7 or 6 symbols in the time axis. A time-frequency region defined by such a slot as described above and 12 sub-carriers in the frequency axis may be referred to as a Resource Block (RB).

The transmission time of a radio frame has a length of 10 ms and may be divided into Transmission Time Intervals (TTIs), each having a duration of 1.0 ms. The terms, "TTI" and "sub-frame", may be used as have the same meaning.

As described above, the TTI is a basic transmission unit, and one TTI includes two time slots, each having the same length, wherein each time slot may have a duration of 0.5 ms. The time slot includes 7 or 6 Long Blocks (LBs), each of which corresponds to a symbol. The LBs are separated from each other by Cyclic Prefixes (CPs). In summary, one TTI or sub-frame may include 14 or 12 LB symbols. However, the present specification is not limited to the frame, sub-frame, or time-slot structure as described above.

Each TTI or sub-frame can be divided into 14 or 12 symbols (axes) in the time axis. Each symbol (axis) can carry one OFDM symbol.

Further, the entire system bandwidth having a length of 20 MHz can be divided into sub-carriers having different frequencies. For example, an area, which includes 14 or 12 symbols in the time axis and 12 subcarriers (12 consecutive subcarriers within one TTI) in the frequency axis, may be referred to as a pair of Resource Block (RB).

For example, the bandwidth of 10 MHz within one TTI may include 50 RB pairs in the frequency axis.

In the RB structure shaped like a grid as described above, each unit space shaped like a grid cell is referred to as a Resource Element (RE), and each subframe or Resource Block (RB) pairs having the structure as described above may include a total of 168 REs (=14 symbols×12 sub-carriers) or 144 REs (=12 symbols×12 sub-carriers).

In the LTE communication system, the downlink reference signals include a Cell-specific Reference Signal (CRS), a Multicast/Broadcast over Single Frequency Network (MBSFN) reference signal, and a UE-specific reference signal (DM-RS reference signal) are defined.

Among those reference signals, the CRS reference signal may be used for unicast transmission rather than MBSFN transmission, and thus, may be included in and transmitted by all downlink subframes within a cell which does not support the MBSFN transmission. Further, the CRS may be transmitted through one or multiple antennas from among antenna port number 0 to 3.

Further, one reference signal is transmitted through each downlink antenna port, and an RE used for transmission of an RS through one port from among the antenna ports within a slot may not be used for another antenna port within the same slot.

It is possible to provide an example in which CRSs are mapped to time-frequency REs different according to four different antenna ports. In each antenna port, the REs, to which CRSs are allocated, may have a cycle of 6 REs for the sub-carriers.

Some next generation communication technologies support a maximum of eight antennas in the downlink. That is, the CRSs defined for the four existing antennas are insufficient for detection of channel information at the time of downlink transmission. To this end, a reference signal named "Channel State Information-Reference Signal (CSI-RS)" is newly defined in order to obtain channel state information for a maximum of eight antennas in the downlink.

According to the current discussion in the LTE-A, CSI-RSs are mapped to one RE for each antenna port in an area including 12 sub-carriers corresponding to one RB pairs along the frequency axis and at every predetermined cycle along the time axis for each cell. Thus, for a total of eight antenna ports, a maximum of 8 REs are allocated and transmitted. In this event, the predetermined cycle corresponds to a multiple of the time of 5 ms including 5 subframes (that is, the predetermined cycle may be 5 ms, 10 ms, etc.). If the predetermined cycle is 5 ms, the CSI-RSs are transmitted by a total of two subframes among the 10 subframes within one radio frame corresponding to 10 ms. Therefore, once the CSI-RS pattern for one subframe is defined, the CSI-RSs can be allocated to the other subframes with a predetermined cycle.

A communication system using a maximum of 8×8 Multiple Input Multiple Output (MIMO) antennas at both the transmission port and the reception port is disclosed. In this system, since CSI-RSs being different according to the antenna ports or antenna layers are transmitted, a transmitter may allocate CSI-RSs for a total of eight antenna ports to a time-frequency domain in a discriminatory manner. Thus, the CSI-RSs may be allocated in a manner capable of discriminating cells from each other in the multi-cell environment.

In the present specification, antenna layers refer to data layers which can be logically simultaneously transmitted from an eNodeB or a UE to multiple antenna ports. However, the antenna layers may have the same data or different data.

Therefore, the number of the antenna layers may be equal to or smaller than the number of antenna ports.

The following description is based on the antenna port, although it can be applied to the antenna layer.

As noted from the above discussion, the basic definition on the CSI-RS and the overhead of each antenna port for one subframe has been disclosed. However, a method for allocation and transmission of a corresponding reference signal pattern according to each antenna port in each eNodeB (or cell) has not been specifically disclosed. Therefore, a method of configuring a CSI-RS pattern for at least one subframe will now be disclosed.

An example of REs usable for the CSI-RSs may be obtained by using the definition as described above. For a single subframe, and specifically in the case of normal subframe, locations of existing CRSs, the control region, and the LTE Rel-9/10 DM-RS (Demodulation Reference Signal), among a total of 14 symbols are taken into consideration. Based on this consideration, CSI-RSs may be allocated to and transmitted by the $10^{th}$ or $11^{th}$ symbol so as to prevent overlapping with the existing CRSs.

Further, for the normal subframe, a scheme different from the method described above may be used in determining REs usable for the CSI-RSs in the case of considering even the DM-RS of Rel-8.

For one subframe, it is important to allocate a CSI-RS pattern which has an orthogonality for each antenna port. However, if eNodeBs (or cells) are distinguished only by CSI-RS sequences mapped to defined CSI-RS patterns, it may cause many neighbor cells to simultaneously transmit CSI-RSs through the same time-frequency resource, resulting in interference between neighbor cells. This may cause significant performance degradation. Throughout this disclosure, the term "orthogonality" may refer to perfect orthogonality, but is not necessarily limited as such.

Particularly, in a communication system such as a Cooperative Multipoint Tx/Rx System (CoMP), where a user transmits/receives a reference signal to/from a neighbor cell as well as a serving cell, with which the user is currently performing transmission/reception, reception power of a CSI-RS of the neighbor cell is weaker than that of the serving cell. Therefore, if the serving cell and the neighbor cell simultaneously transmit CSI-RSs through the same time-frequency resource, the user may have difficulty in properly detecting the CSI-RS from the neighbor cell.

Accordingly, this embodiment may provide a scheme, in which a CSI-RS is allocated (or mapped) and then transmitted with a orthogonality with respect to time-frequency resources for each cell, thereby reducing the performance degradation caused by interference between neighbor cells.

The CP length, Duplex scheme (TDD or FDD), etc. may change the structure of the subframe. The present embodiment presents a method of allocating or mapping and transmitting CSI-RSs while enabling each cell (or cell group) to have a orthogonality with respect to time-frequency resources for each of the various types of subframes.

Therefore, an embodiment of the present invention may include the steps of: receiving an input of subframe structure information of a subframe to be allocated a CSI-RS, a cell ID (Identifier), eNodeB (or cell) information including bandwidth information or antenna port number of an eNB, and system information including a subframe number; and allocating CSI-RSs of each antenna port to resource areas while one or more cells (or cell groups) to have an orthogonality in frequency/time resources by using the subframe structure information and the system information.

The subframe structure information may include CP length information and Duplex scheme information (FDD/TDD). If the Duplex scheme is TDD, one or two special subframe(s) in a radio frame may include the number of OFDM symbols for the downlink (DwPTS) within a special subframe, and the step of allocating the CSI-RSs may include an additional consideration on whether to use AP (antenna port) 2 and AP (antenna port) 3 corresponding to the third and fourth CRS antenna ports.

FIG. 1 is a block diagram illustrating a structure of a CSI-RS allocation apparatus according to an exemplary embodiment of the present invention.

Referring to FIG. 1, a CSI-RS allocation apparatus 100 includes a CSI-RS generator 110 and a CSI-RS resource allocator 120.

The CSI-RS generator 110 receives information, such as subframe structure information and system information, and generates a CSI-RS or a CSI-RS sequence based on the received information. The subframe structure information reflects one or more combinations of the CP length or CP structure method (Normal CP or Extended CP) within a subframe and the number of used antennas of each existing CRS or DM-RS (including Rel-8 DM-RS), in order to detect the structure of the subframe to which the CSI-RS is currently applied and generate a CSI-RS pattern proper for the detected structure. The system information may include one or more combinations of eNodeB (or cell) information, relay node information, UE information, and subframe number. The eNodeB (or cell) information, for example, may be eNodeB (or cell) antenna information, eNodeB (or cell) bandwidth information, and cell ID information. The system information may include a cell ID, so as to enable the configuration of a CSI-RS capable of identifying each cell group.

For example, the CSI-RS generator 110 determines a length of a sequence by using system-specific information such as bandwidth information of an eNodeB, and receives cell ID information and selects a CSI-RS of a corresponding cell ID which has been predetermined.

The CSI-RS resource allocator 120 receives the subframe structure information, the system information, and the frame timing information, and allocates CSI-RSs according to antenna ports, which have been generated by the CSI-RS generator 110, to time-frequency resource elements. Thereafter, the CSI-RSs allocated to REs are multiplexed with eNodeB transmission frames.

The CSI-RS resource allocator 120 performs a basic function for allocating resources of an OFDM symbol (the x-axis) and a subcarrier location (the y-axis) by a predetermined rule in a resource allocation method for CSI-RSs, and multiplexing allocated resources with eNodeB transmission frames at predetermined frame timing.

If allocating CSI-RSs for each of a maximum of 8 antenna ports to a time-frequency domain, the CSI-RS resource allocator 120 according to this embodiment allocates CSI-RSs of each antenna port to time-frequency resource elements while securing orthogonality for each cell (or cell group) according to the subframe type determined depending on the subframe structure information, and system information such as cell ID.

FIGS. 2 to 14 illustrate various CSI-RS allocation schemes according to the first to eighth embodiments according to exemplary embodiments of the present invention, which are determined by various conditions including the CP length, duplex scheme, the number of OFDM symbols for the downlink (DwPTS) within a special subframe in the case of TDD, and the existence or absence of duplication allocation of AP5.

A CSI-RS for a particular antenna port can be allocated in such a manner as to have frequency shifts in the direction of the frequency axis according to cells (or cell groups). Particularly, if there are 8 antenna ports for the CSI-RSs, the CSI-RS allocation may have three types of shifts along the frequency axis. Specifically, CSI-RSs of the same antenna port may be allocated with a shift by one subcarrier or RE in the direction of the frequency axis for each of 3 cells (or cell groups), so that the cells (or cell groups) can have distinguishable CSI-RS allocation patterns, respectively. Further, if there are 8 antenna ports for the CSI-RSs, the cells (or cell groups) may have distinguishable CSI-RS allocation patterns for each of two or three cells (or cell groups), through two or three types of shifts along the symbol axis and the frequency axis.

The embodiments for the CSI-RS allocation to subframes with discrimination between cells (or cell groups) according to whether there is a duplicated allocation (allocation with consideration) of AP5, and according to each subframe structure by the number of OFDM symbols for the downlink (DwPTS) within a special subframe if the Duplex scheme is TDD, and the CP length will be described in more detail with reference to FIGS. 2 to 11.

A wireless communication system, to which embodiments of the present invention are applied, includes a CSI-RS allocation apparatus 100 according to this embodiment as shown in FIG. 1. The CSI-RS allocation apparatus may include a CSI generator 110 and a CSI-RS resource allocator 120.

The wireless communication system may further include a scrambler, a modulation mapper, a layer mapper, a precoder, an RE mapper, an OFDM signal generator, etc., which are elements of a basic transmission apparatus. However, the structure as described above is not essential in this embodiment.

This wireless communication system may be a communication system of the eNodeB.

A basic operation of the wireless communication system will now be described. Bits, which go through channel coding and are input in the form of codeword in a downlink, are scrambled by the scrambler, and are then input to the modulation mapper. The modulation mapper modulates the scrambled bits to a complex modulation symbol. The layer mapper maps the complex modulation symbol to a single or multiple transmission layer(s). The precoder precodes the complex modulation symbol over each transmission channel of an antenna port. Thereafter, the RE mapper maps the complex modulation symbol for each antenna port to a relevant resource element.

In this embodiment, the CSI-RS generator generates a CSI-RS, and provides the generated CSI-RS to the CSI-RS resource allocator. The CSI-RS resource allocator, individually or in conjunction with the resource element mapper, allocates CSI-RSs according to antenna ports to a time-frequency domain in the scheme as described above, and multiplexes the allocated CSI-RSs with eNodeB transmission frames at a predetermined timing.

Thereafter, the OFDM signal generator generates a complex time domain OFDM signal for each antenna port, and transmits the generated complex time domain OFDM signal through the relevant antenna port.

The CSI-RS allocation apparatus and the resource element mapper may be implemented through integration of them by hardware or software.

Figure 2:
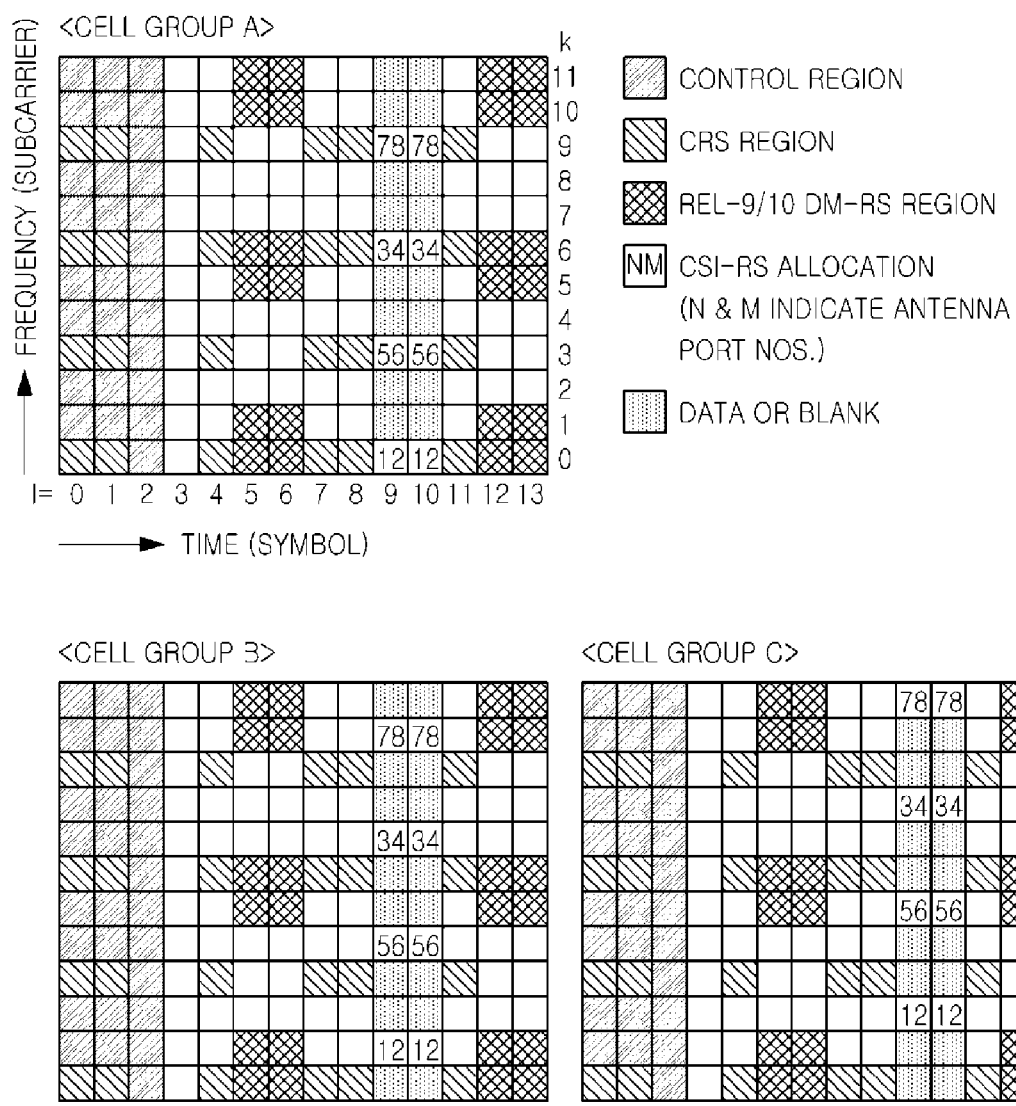
FIGS. 2 to 14 illustrate various CSI-RS allocation schemes according to exemplary embodiments of the present invention, which are determined by various conditions including the CP length, duplex scheme, the number of OFDM symbols for the downlink (DwPTS) within a special subframe in the case of TDD, and the existence or absence of duplication allocation AP5.

A CSI-RS allocation scheme as shown in FIG. 2 may be applied to a typical structure, such as subframe structure according to the FDD scheme of a normal CP.

According to the CSI-RS allocation scheme as shown in FIG. 2, CSI-RSs are allocated to time-frequency resource areas for each of a maximum of 8 antenna ports, wherein the CSI-RSs of the antenna port are allocated to four REs or subcarriers by the unit of one symbol (symbol axis) within one subframe, and neighbor CSI-RS allocated REs or subcarriers are spaced with an interval of three REs or subcarriers. In this event, the CSI-RSs are allocated to a total of two symbols (symbol axes) within one subframe (for example, the CSI-RSs may be allocated to the $10^{th}$ and $11^{th}$ OFDM symbols as shown in FIG. 2), each of the CSI-RSs with respect to each of a total of eight antenna ports is duplicately allocated to two REs while being discriminated from CSI-RSs of another antenna port by an orthogonal code. That is, a total of eight antenna ports is tied into four pairs, which are discriminated from each other through FDM, and two antenna ports within each pair are discriminated from each other by CDM (CDM-T) using an orthogonal code such as the Orthogonal Cove Code (OCC).

In this event, the CSI-RS resource allocator performs the allocation while causing a shift of a CSI-RS for a particular antenna port in the direction of frequency axis for each cell (or cell group). Further, the CSI-RS resource allocator may perform the blanking, which empties the REs, in which another cell group except for its own cell group (the cell group to which the serving cell belongs) sends CSI-RSs, without sending data to the REs, or the muting, which performs the transmission using zero power. That is, the CSI-RS resource allocator performs the allocation while causing a frequency shift of CSI-RSs of the same antenna port for each cell (cell group). Further, the CSI-RS resource allocator performs the allocation while causing CSI-RSs of the same antenna port to make a frequency shift by one subcarrier or RE in the direction of the frequency axis for each of 3 cells (or cell groups), so that at least three cell groups within one subframe can have distinguished CSI-RS allocation patterns.

Although FIG. 2 shows a method of configuring a CSI-RS for a predetermined subframe, this method applies to a case corresponding to a normal CP and an FDD among various subframe structures. Therefore, a scheme may be arranged to configure a CSI-RS for the other subframe structure includes an extended CP or the duplex scheme is TDD. Further, although the method shown in FIG. 2 does not take AP5 (antenna port No. 5), which is an LTE Rel-8 DM-RS, into consideration, the existence of AP5 may be considered in configuring the CSI-RS if a legacy impact by the AP5 is big.

Therefore, embodiments of the present invention as shown in FIGS. 2 to 11 present a method for CSI-RS allocation and transmission, which may reduce the performance degradation due to interference between neighbor cells in various subframe structures, through the CSI-RS allocation and transmission with an orthogonality (an orthogonality in view of time/frequency resources) for each of multiple cell groups according to each subframe structure, such as information on whether there is a duplicated allocation (allocation with consideration) of AP5, the Duplex scheme (FDD/TDD), and the CP length.

Figure 10:
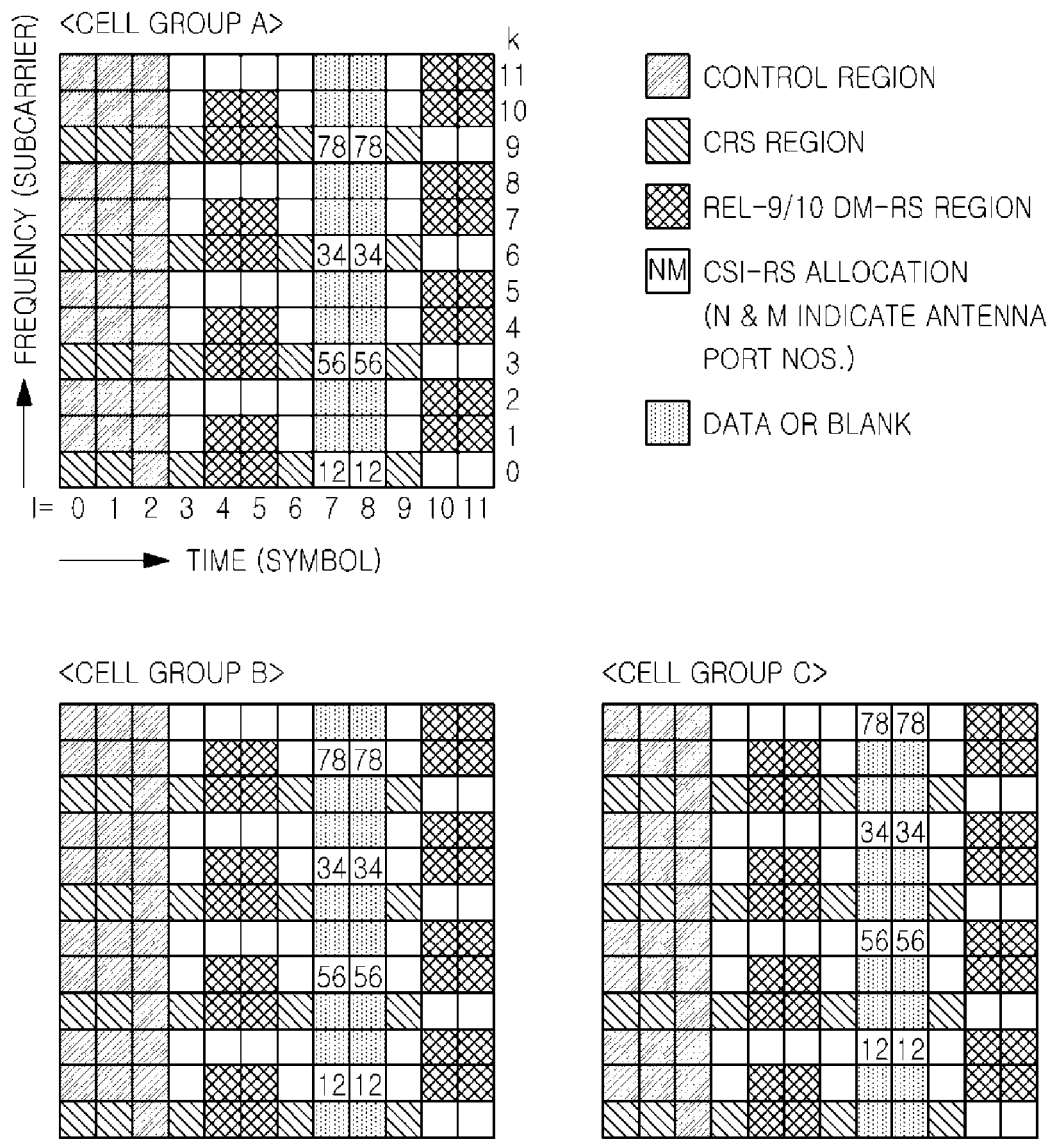

Especially, under the condition of a subframe as in the embodiment shown in FIG. 10, in which the CP is an extended CP, the duplex scheme is TDD, and a duplicated allocation to AP5 is allowed, if CSI-RSs for maximum 8 antenna ports are allocated, the CSI-RSs may be allocated to the 8th and 9th symbols (symbol No. l=7 and 8), in such a manner that CSI-RSs for every two antenna ports are allocated to the same RE while being discriminated from each other by an orthogonal code and neighbor CSI-RS allocated REs are spaced by an interval of three REs, which thus include two empty REs between two CSI-RS allocated REs.

FIGS. 2 to 11 illustrate various CSI-RS allocation schemes under various conditions including the CP length, duplex scheme, and consideration or non-consideration of AP5 according to embodiments of the present invention.

AP0, AP1, AP2, and AP3 are antenna ports for CRS, and AP5 is an antenna port for Rel-8 DM-RS. If only two antennas are used for the CRS, only AP0 and AP1 are used and AP2 and AP3 are not used. In the case of TDD, differently from FDD, a total of 10 subframes include downlink subframes and uplink subframes, which are separately arranged, and one or two special subframe(s), which separately includes an OFDM symbol for the downlink (DwPTS), a Guard Band (GB), and an OFDM symbol for the uplink (UpPTS) within a special subframe. The OFDM symbol for the downlink (DwPTS) within the special subframe has different lengths according to the special subframe mode and/or according to whether the configured subframe includes a normal CP or an extended CP. For example, in the case of a normal CP, the number of OFDM symbols for the downlink within the special subframe is one of the numbers 3, 9, 10, 11, and 12, among the total of 14 symbols. In the case of the extended CP, the number of OFDM symbols for the downlink within the special subframe is one of the numbers 3, 8, 9, or 10. However, the present invention is not limited to these numbers.

In this event, FS 1 (Frame Structure type 1) means FDD, and FS 2 (Frame Structure type 2) means TDD.

FIG. 2 shows a CSI-RS allocation scheme according to a first embodiment of the present invention, for a downlink subframe in which the CP is a normal CP and the duplex scheme is FDD or TDD.

Further, in the first embodiment of the present invention as shown in FIG. 2, a duplicated allocation of AP5 is allowed (that is, CSI-RS allocation to the location of AP5 is allowed), without consideration on whether to use AP2 or AP3 (that is, it is the same regardless of either if AP2 or AP3 is used or if AP2 or AP3 is not used).

The following configuration is applied to the first embodiment of the present invention.

Two consecutive OFDM symbols are used, which may include the 10$^{th}$ and the 11$^{th}$ symbols (i.e. l=9 and 10).

Every two antenna ports are tied into one pair, and pairs are multiplexed by FDM while two consecutive OFDM symbols for two antenna ports within each pair are multiplexed by CDM (i.e. CDM-T) by using an orthogonal code such as the Orthogonal Cove Code (OCC).

In the present embodiment, the orthogonal code may be a code having the orthogonality, such as a two digit Walsh Code. That is, in FIG. 2, the CSI-RS of antenna port indicated on the preceding RE may be identified by orthogonal code 1 (OCC 1), such as [1, 1], while the CSI-RS of antenna port indicated on the following RE may be identified by orthogonal code 2 (OCC 2), such as [1, −1].

In FIGS. 2 to 11, REs having numbers recorded thereon correspond to REs to which CSI-RSs are allocated, and the numbers correspond to numbers of antenna ports to which the CSI-RSs are allocated.

Antenna ports for 2/4/8 CSI-RSs may be allocated to two symbols (even if 3/5/7 antenna ports are allocated, with the addition of one more antenna port to the corresponding number of antenna ports to make the even CSI-RSs antenna ports. That is, if 7 antenna ports are allocated, 8 antenna ports are considered for the CSI-RS configuration, which results in that the number of antenna ports is 8 and one half of the number of antenna ports is 4), and the CSI-RSs are allocated to REs corresponding to one half of the number of antenna ports for each symbol. For example, if antenna ports for 8 CSI-RSs are allocated, CSI-RSs for each antenna port are allocated to 4 REs (or subcarriers) in each symbol.

An interval of REs corresponding to "24/(number of antenna ports)" along the frequency axis is arranged between neighbor CSI-RS allocated REs for one symbol axis. For example, if antenna ports for 8 CSI-RSs are allocated, an interval of 3 REs along the frequency axis is established (which implies that 2 empty REs exist) between neighbor CSI-RS allocated REs for one symbol axis.

According to the cell group ID, a frequency shift may occur by the unit of a total of 12 subcarriers. In this event, based on the interval between neighbor CSI-RS allocated REs, it is possible to generate cell group-specific patterns (reuse factor having the orthogonality), which are discriminated from each other and correspond to a maximum of "24/(number of antenna ports)", within one subframe. In this event, for example, if antenna ports for 8 CSI-RSs are allocated, it is possible to generate a total of three cell group-specific patterns, which are perfectly discriminated from each other, within one subframe.

Among the REs, it is possible to perform the blanking, which empties the REs, to which another cell group except for its own cell group (the cell group to which the serving cell belongs) sends CSI-RSs, without sending data to the REs, or the muting, which performs the transmission using zero power.

The CSI-RS allocation scheme according to the first embodiment of the present invention as described above can be expressed by Equation 1 below. Equation 1 below shows a representative example for helping the understanding of the present invention and may be expressed in another way within the range capable of maintaining the basic scheme described above.

$$\begin{aligned} &CSI\text{-}RS \text{ antenna port} = 1,3,5,7: \ OCC \ [+1, +1] \\ &CSI\text{-}RS \text{ antenna port} = 2,4,6,8: \ OCC \ [+1, -1] \\ &k = 12 \cdot m + (v + v_{shift}) \bmod 12 \\ &l = 9, 10 \\ &m = 0, 1, 2, \ldots, N_{RB}^{DL} - 1 \\ &v = \begin{cases} 0 & \text{if } CSI\text{-}RS \text{ antenna port} = 1,2 \\ 6 & \text{if } CSI\text{-}RS \text{ antenna port} = 3,4 \\ 3 & \text{if } CSI\text{-}RS \text{ antenna port} = 5,6 \\ 9 & \text{if } CSI\text{-}RS \text{ antenna port} = 7,8 \end{cases} \\ &v_{shift} = N_{ID}^{cell} \bmod 12 \end{aligned} \quad \text{[Equation 1]}$$

In Equation 1, k indicates a subcarrier number, l indicates a symbol number, $N_{ID}^{cell}$ indicates a cell ID, and $N_{RB}^{DL}$ indicates the number of RBs in the downlink.

In this event, the number of antenna port, in which the CSI-RS is duplicately allocated to the same RE, and the sequence of the numbers of antenna ports in the frequency direction may change and are not limited by the example shown in FIG. 2. That is, in FIG. 2, as the index of the subcarrier increases, the allocation is performed in the sequence of (1,2), (5,6), (3,4), and (7,8). However, this is not an inevitable condition and another antenna port combination or another sequence, such as (1,2), (3,4), (5,6), and (7,8), may be employed for the allocation, if the index of the subcarrier increases or decreases.

However, as shown in FIG. 2, antenna ports duplicately allocated to one RE may be neighbor antenna ports adjacent to each other. That is, in FIG. 2, the antenna ports duplicately allocated to (l, k)=(9 and 10, 0) may be antenna port 1 and antenna port 2, which are neighbor or adjacent to each other.

As described above, in the first embodiment of the present invention as shown in FIG. 2, CSI-RSs of (1,2), (5,6), (3,4), and (7,8) are allocated to the locations where k=0, 3, 6, and 9, respectively, in the symbol axes of (l=9 and 10) in cell group A, CSI-RSs of (1,2), (5,6), (3,4), and (7,8) are allocated to the locations where k=1, 4, 7, and 10, respectively, which are shifted by +1 along the frequency axis, in the same symbol axis in cell group B, and CSI-RSs of (1,2), (5,6), (3,4), and (7,8) are allocated to the locations where k=2, 5, 8, and 10, respectively, in cell group C.

However, the combination and the sequence of the antenna port numbers arranged in the frequency direction are not necessarily limited to FIG. 2, and another combination or sequence may be employed.

Figure 3:
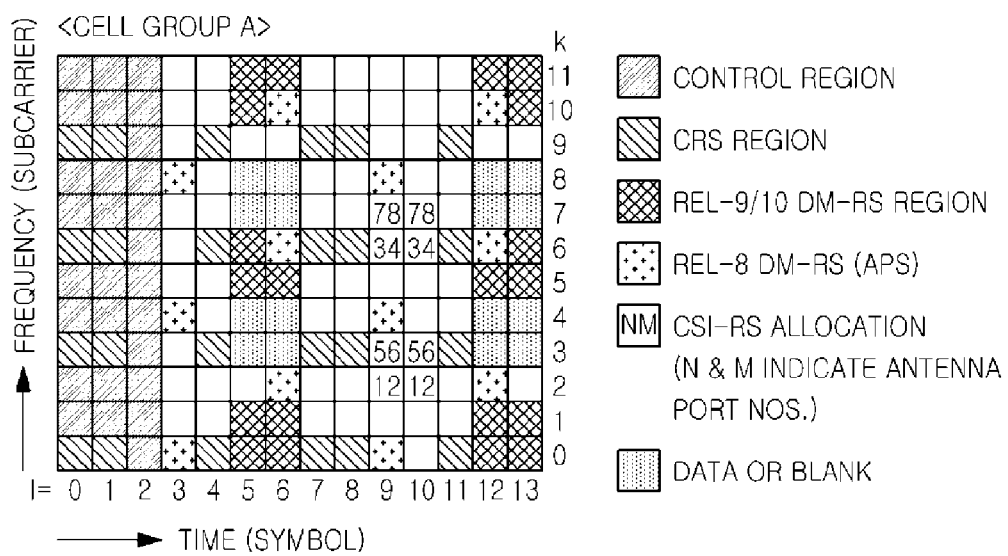
Figure 3:
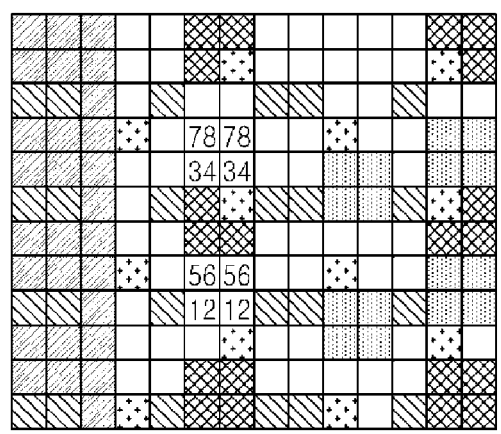
Figure 3:
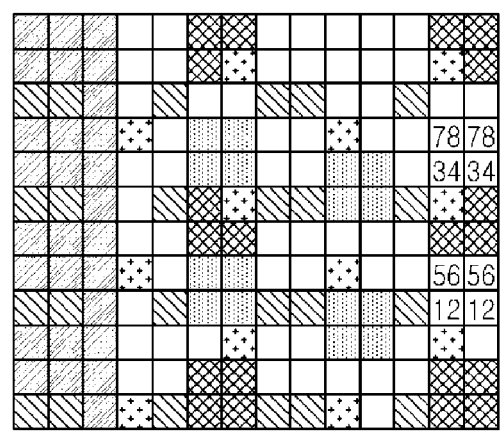

FIG. 3 shows a CSI-RS allocation scheme according to a second embodiment of the present invention, for a downlink subframe in which the CP is a normal CP and the duplex scheme is FDD or TDD, as in the first embodiment shown in FIG. 2.

However, although a duplicated allocation of AP5 is allowed in the first embodiment of the present invention, a duplicated allocation of AP5 is not allowed in the second embodiment of the present invention as shown in FIG. 3.

In the second embodiment of the present invention, whether to use AP2 or AP3 is not considered (that is, it is the same regardless of either if AP2 or AP3 is used or if AP2 or AP3 is not used).

The following configuration is applied to the second embodiment of the present invention.

Two consecutive OFDM symbols are used, and the CSI-RSs are allocated to two different consecutive symbol axes according to the cell.

It is the same as in the first embodiment of the present invention shown in FIG. 2 in view of that an antenna port is identified by an OCC code and the CSI-RSs are allocated to REs corresponding to one half of the number of antenna ports for each symbol in the second embodiment of the present invention.

For a total of three basic cell groups, CSI-RSs may be configured. In the first cell group, CSI-RSs are allocated to the 10th and 11th symbol axes and to the other REs except for the REs, at which AP5 is located, in the 10th and 11th symbol axes. In the second cell group, CSI-RSs are allocated to the 6th and 7th symbol axes and to the other REs except for the REs, at which AP5 and Rel-9/10 DM-RS are located. In the third cell group, CSI-RSs are allocated to the 13th and 14th symbol axes and to the other REs except for the REs, at which AP5 and Rel-9/10 DM-RS are located. In this event, a CSI-RS allocation pattern corresponding to each cell group may be generated by a time/frequency shift of a CSI-RS allocation pattern corresponding to another cell group. For example, the CSI-RS allocation pattern corresponding to the second cell group may be generated by shifting the CSI-RS allocation pattern corresponding to the first cell group by −4 in the OFDM symbol axis corresponding to time and by +1 in the subcarrier axis corresponding to frequency.

If 8 CSI-RS antenna ports are used, it is possible to generate three discriminated cell group-specific patterns (reuse factors having the orthogonality) within one subframe. If two or four CSI-RS antenna ports are used, it is possible to generate 12 or 6 cell group-specific patterns (reuse factors having the orthogonality), which are discriminated from each other, within one subframe.

Further, the construction capable of muting or blanking REs, to which CSI-RSs of another cell (cell group) are allocated, is also the same as that in the first embodiment shown in FIG. 2.

The CSI-RS allocation scheme according to the second embodiment of the present invention shown in FIG. 3 can be expressed by Equation 2 below. Equation 2 below shows a representative example for helping the understanding of the present invention and may be expressed in another way within the range capable of maintaining the basic scheme described above.

$$CSI\text{-}RS \text{ antenna port} = 1,3,5,7: \; OCC \; [+1, +1] \quad \text{[Equation 2]}$$

$$CSI\text{-}RS \text{ antenna port} = 2,4,6,8: \; OCC \; [+1, -1]$$

$$k = 12 \cdot m + (v + v_{shift}) \bmod 12$$

$$l = \begin{cases} 9,10 & \text{if } N_{ID}^{cell} \bmod 3 = 0 \\ 5,6 & \text{if } N_{ID}^{cell} \bmod 3 = 1 \\ 12,13 & \text{if } N_{ID}^{cell} \bmod 3 = 2 \end{cases}$$

$$m = 0, 1, 2, \ldots, N_{RB}^{DL} - 1$$

$$v = \begin{cases} 2 & \text{if } CSI\text{-}RS \text{ antenna port} = 1,2 \\ 6 & \text{if } CSI\text{-}RS \text{ antenna port} = 3,4 \\ 3 & \text{if } CSI\text{-}RS \text{ antenna port} = 5,6 \\ 7 & \text{if } CSI\text{-}RS \text{ antenna port} = 7,8 \end{cases}$$

$$v_{shift} = \begin{cases} 0 & \text{if } N_{ID}^{cell} \bmod 3 = 0 \\ 1 & \text{else} \end{cases}$$

In this event, the change in the number of an antenna port, in which the CSI-RS is duplicately allocated to the same RE, and the sequence of the numbers of antenna ports in the frequency direction may be similar to that of the first embodiment shown in FIG. 2.

Further, although FIG. 3 shows combinations of four REs, which include combinations of (1,2)+(5,6) and (3,4)+(7,8), the present invention is not limited to the combinations shown in FIG. 3, and may employ another combination or sequence.

In conclusion, according to the second embodiment shown in FIG. 3, two consecutive cell group-specific symbol axes are used, wherein one cell group A may be shifted by −1 from the other cell groups B and C in the frequency axis.

Figure 4:
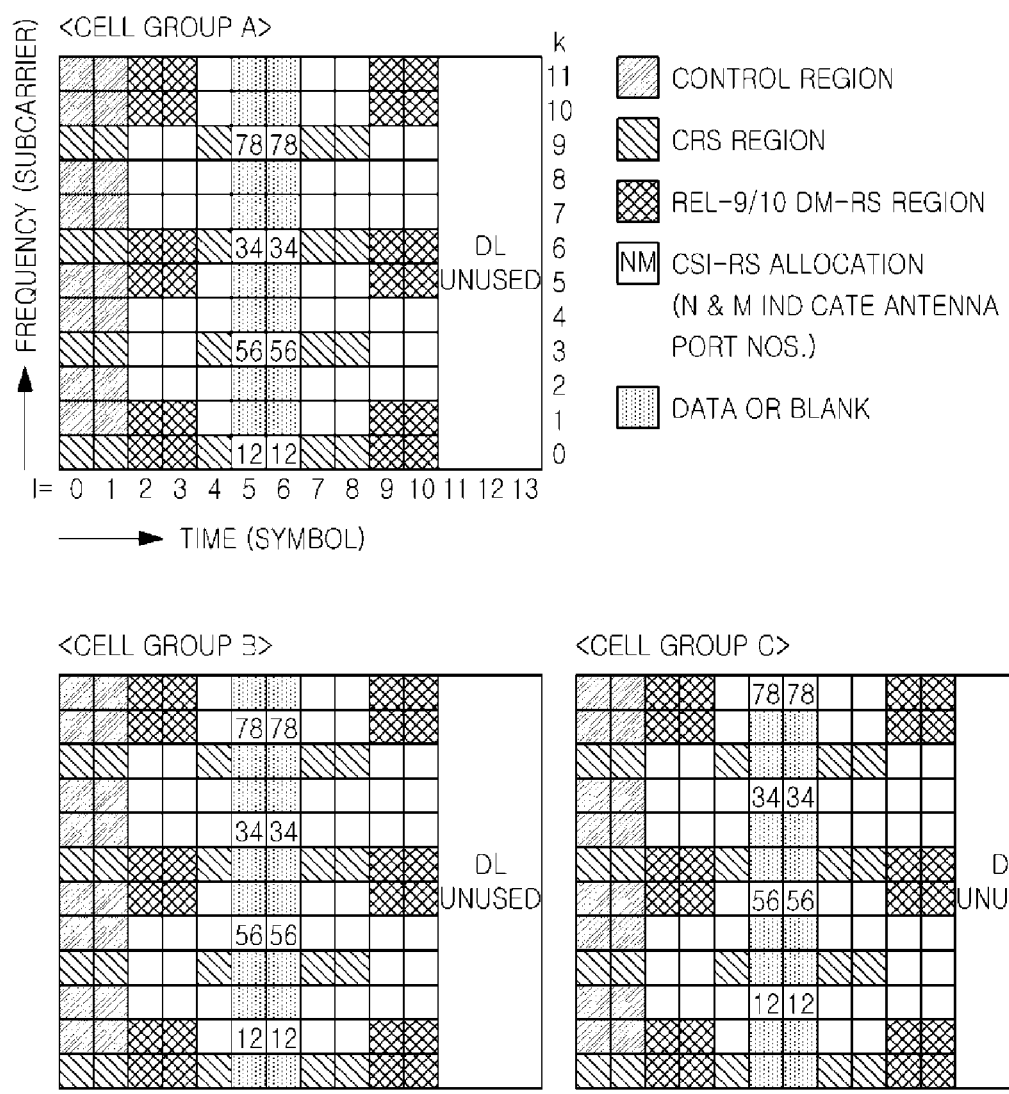

FIG. 4 shows a CSI-RS allocation scheme according to a third embodiment of the present invention, for a subframe in which the CP is a normal CP, the duplex scheme is TDD, and the number of OFDM symbols allocated to the downlink (DwPTS) within the subframe is 11 or 12. In this event, the subframe may be the special subframe in TDD as described above.

Further, in the third embodiment of the present invention, duplicated allocation of AP5 is allowed, and whether to use AP2 or AP3 is not considered.

The following configuration is applied to the third embodiment of the present invention shown in FIG. 4.

Two consecutive OFDM symbols are used, which may include the 6th and the 7th symbols (i.e. l=5 and 6).

It is the same as in the first embodiment of the present invention shown in FIG. 2 in view of that an antenna port is identified by an OCC code and the CSI-RSs are allocated to REs corresponding to one half of the number of antenna ports for each symbol in the second embodiment of the present invention.

As in the first embodiment, an interval of REs corresponding to "24/(number of antenna ports)" along the frequency axis is arranged between neighbor CSI-RSs allocated REs for one symbol axis.

As in the first embodiment shown in FIG. 2, according to the cell group ID, it is possible to generate cell group-specific patterns, which are discriminated from each other and correspond to a maximum of "24/(number of antenna ports)", within one subframe. Further, the construction capable of muting or blanking REs, to which CSI-RSs of another cell (or cell group) are allocated, is also the same as that in the first embodiment shown in FIG. 2.

The CSI-RS allocation scheme according to the third embodiment of the present invention shown in FIG. 4 can be expressed by Equation 3 below. Equation 3 below shows a representative example for helping the understanding of the present invention and may be expressed in another way within the range capable of maintaining the basic scheme described above.

$$CSI\text{-}RS \text{ antenna port} = 1,3,5,7: \; OCC \; [+1, +1] \quad \text{[Equation 3]}$$
$$CSI\text{-}RS \text{ antenna port} = 2,4,6,8: \; OCC \; [+1, -1]$$
$$k = 12 \cdot m + (v + v_{shift}) \bmod 12$$
$$l = 5,6$$
$$m = 0, 1, 2, \ldots, N_{RB}^{DL} - 1$$
$$v = \begin{cases} 0 & \text{if } CSI\text{-}RS \text{ antenna port} = 1,2 \\ 6 & \text{if } CSI\text{-}RS \text{ antenna port} = 3,4 \\ 3 & \text{if } CSI\text{-}RS \text{ antenna port} = 5,6 \\ 9 & \text{if } CSI\text{-}RS \text{ antenna port} = 7,8 \end{cases}$$
$$v_{shift} = N_{ID}^{cell} \bmod 12$$

In this event, as in the first embodiment shown in FIG. 2, the number of antenna port, in which the CSI-RS is duplicately allocated to the same RE, and the sequence of the numbers of antenna ports in the frequency direction may change differently from those in FIG. 4.

Further, the frequency shift of each cell group is not limited to the structure shown in FIG. 4. Also, the combination and the sequence of the antenna port numbers arranged in the frequency direction are not necessarily limited to FIG. 4 and another combination or sequence different from that shown in FIG. 4 may be employed.

Figure 5:
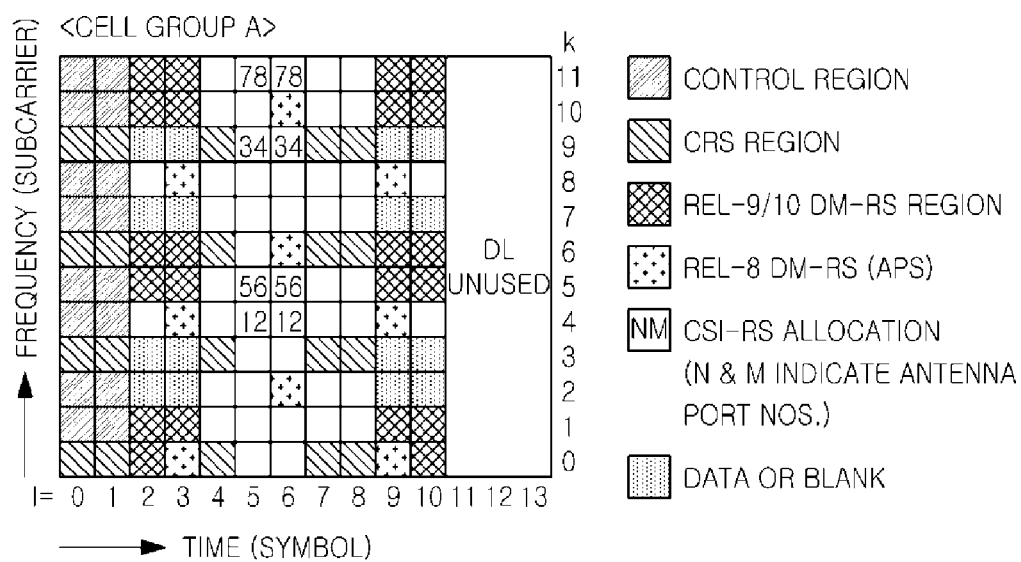
Figure 5:
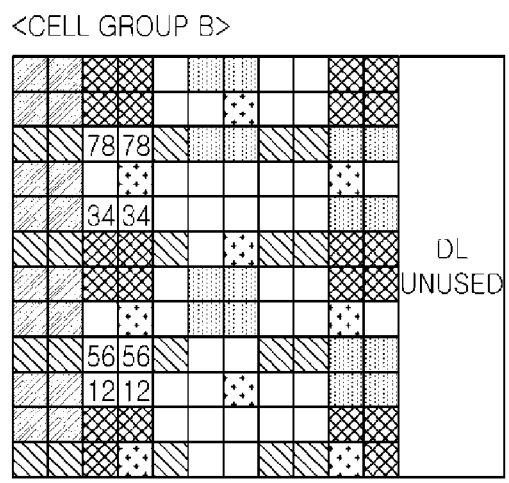
Figure 5:
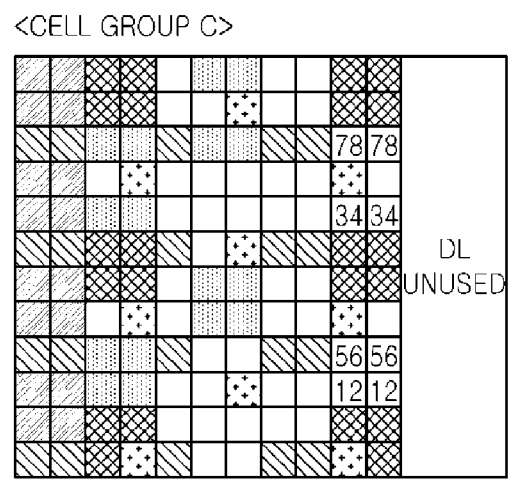

FIG. 5 shows a CSI-RS allocation scheme according to a fourth embodiment of the present invention, for a subframe in which the CP is a normal CP, the duplex scheme is TDD, and the number of OFDM symbols allocated to the downlink (DwPTS) within the subframe is 11 or 12, as in the third embodiment of the present invention. However, in the fourth embodiment of the present invention, duplicated allocation of AP5 is not allowed, In this event, the subframe may be the special subframe as described above.

Further, in the fourth embodiment of the present invention, whether to use AP2 or AP3 is not considered.

The following configuration is applied to the fourth embodiment of the present invention shown in FIG. 5.

Two consecutive OFDM symbols are used, and the CSI-RSs may be allocated to two different consecutive symbol axes according to the cell.

It is similar to the first embodiment of the present invention, shown in FIG. 2, in view of that an antenna port is identified by an OCC code and the CSI-RSs are allocated to REs corresponding to one half of the number of antenna ports for each symbol in the second embodiment of the present invention.

CSI-RSs may be configured for a total of three basic cell groups discriminated from each other. In the first cell group, CSI-RSs are allocated to the 6th and 7th symbol axes and to the other REs except for the REs, at which AP5 is located, in the 6th and 7th symbol axes. In the second cell group, CSI-RSs are allocated to the 3rd and 4th symbol axes and to the other REs except for the REs, at which AP5 and Rel-9/10 DM-RS are located, in the 3rd and 4th symbol axes. In the third cell group, CSI-RSs are allocated to the 10th and 11th symbol axes and to the other REs except for the REs, at which AP5 and Rel-9/10 DM-RS are located, in the 10th and 11th symbol axes. In this event, a CSI-RS allocation pattern corresponding to each cell group may be generated by a time/frequency shift of a CSI-RS allocation pattern corresponding to another cell group. For example, the CSI-RS allocation pattern corresponding to the second cell group may be generated by shifting the CSI-RS allocation pattern corresponding to the first cell group by −3 in the OFDM symbol axis corresponding to time and by −2 in the subcarrier axis corresponding to frequency.

If 8, 4, and 2 CSI-RS antenna ports are used, it is possible to generate 3, 6, and 12 discriminated cell group-specific patterns (reuse factors having the orthogonality) within one subframe, respectively, similarly to the second embodiment shown in FIG. 3. Further, the construction capable of muting or blanking REs, to which CSI-RSs of another cell (cell group) are allocated, is also the same as that in the second embodiment shown in FIG. 3.

The CSI-RS allocation scheme according to the fourth embodiment of the present invention shown in FIG. 5 can be expressed by Equation 4 below. Equation 4 shows a representative example for helping the understanding of the present invention and may be expressed in another way within the range capable of maintaining the basic scheme described above.

$$CSI\text{-}RS \text{ antenna port} = 1,3,5,7: \; OCC \; [+1, +1] \quad \text{[Equation 4]}$$
$$CSI\text{-}RS \text{ antenna port} = 2,4,6,8: \; OCC \; [+1, -1]$$
$$k = 12 \cdot m + (v + v_{shift}) \bmod 12$$
$$l = \begin{cases} 5,6 & \text{if } N_{ID}^{cell} \bmod 3 = 0 \\ 2,3 & \text{if } N_{ID}^{cell} \bmod 3 = 1 \\ 9,10 & \text{if } N_{ID}^{cell} \bmod 3 = 2 \end{cases}$$
$$m = 0, 1, 2, \ldots, N_{RB}^{DL} - 1$$
$$v = \begin{cases} 4 & \text{if } CSI\text{-}RS \text{ antenna port} = 1,2 \\ 9 & \text{if } CSI\text{-}RS \text{ antenna port} = 3,4 \\ 5 & \text{if } CSI\text{-}RS \text{ antenna port} = 5,6 \\ 11 & \text{if } CSI\text{-}RS \text{ antenna port} = 7,8 \end{cases}$$
$$v_{shift} = \begin{cases} 0 & \text{if } N_{ID}^{cell} \bmod 3 = 0 \\ -2 & \text{else} \end{cases}$$

The number of antenna port, in which the CSI-RS is duplicately allocated to the same RE, and the sequence of the numbers of antenna ports in the frequency direction may change, as in the first embodiment shown in FIG. 2.

Further, although FIG. 5 shows a scheme of allocating a combination of (1,2)+(5,6) to four neighbor REs while allocating (3,4) and (7,8) to spaced REs, the present invention is not limited to the scheme shown in FIG. 5 and may employ another combination or sequence.

Thus, according to the fourth embodiment shown in FIG. 5, two consecutive cell group-specific symbol axes are used, wherein one cell group A may be shifted by +2 from the other cell groups B and C in the frequency axis.

Figure 6:
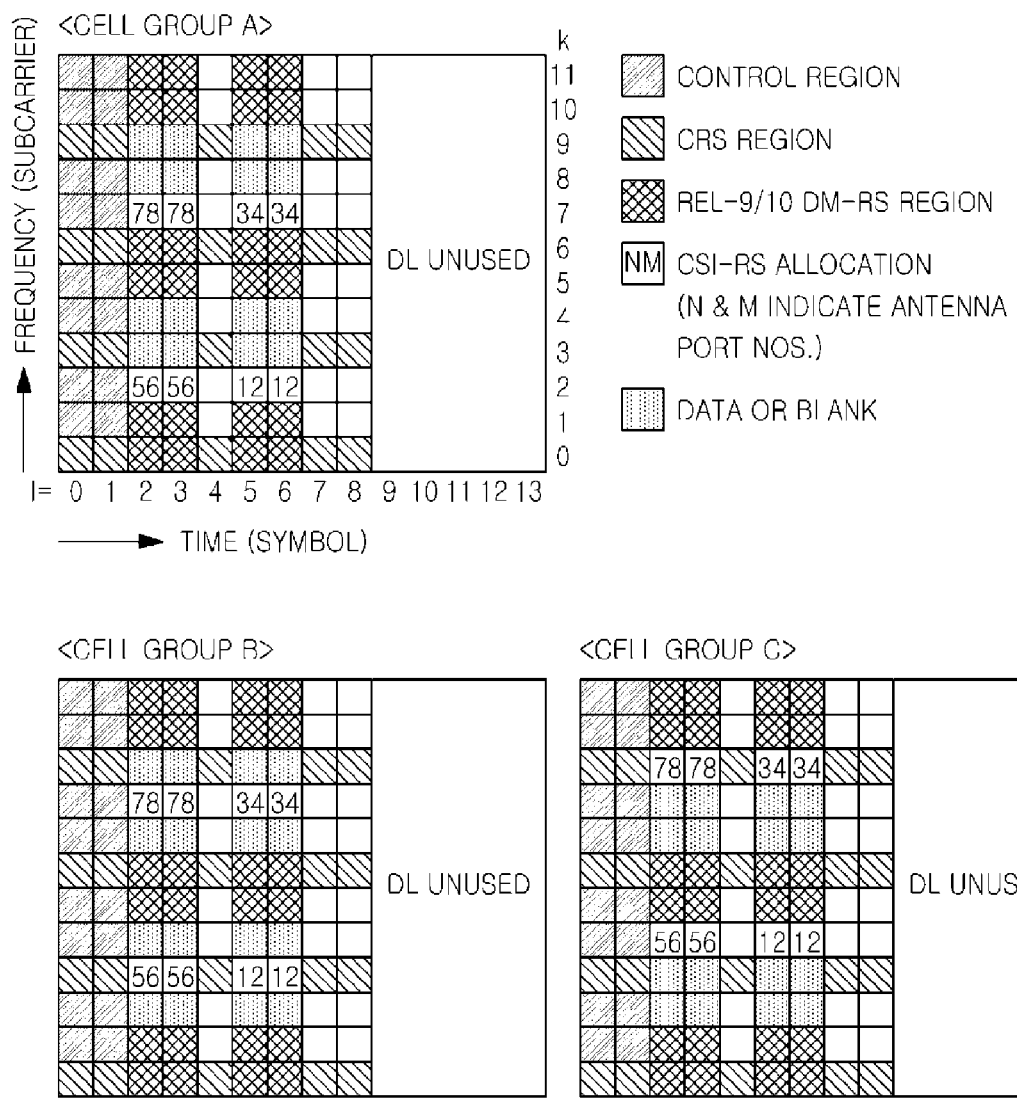

FIG. 6 shows a CSI-RS allocation scheme according to a fifth embodiment of the present invention, for a subframe in which the CP is a normal CP, the duplex scheme is TDD, and the number of OFDM symbols allocated to the downlink (DwPTS) within the subframe is 9 or 10.

In this event, the subframe is the special subframe as described above.

Further, in the fifth embodiment of the present invention, duplicated allocation of AP5 is allowed, and whether to use AP2 or AP3 is not considered.

The following configuration is applied to the fifth embodiment of the present invention shown in FIG. 6.

Four OFDM symbols are used, which may include the 3rd, 4th, 6th, and the 7th symbols, in cooperation with Rel-9/10 DM-RS.

It is the same as in the first embodiment of the present invention shown in FIG. 2 in view of that an antenna port is identified by an OCC code and the CSI-RSs are allocated to REs corresponding to one half of the number of antenna ports for each symbol in the second embodiment of the present invention.

According to the cell group ID, a frequency shift may occur. Moreover, if necessary, a symbol axis shift may additionally occur. That is, although FIG. 6 shows only the frequency shift according to each cell ID for the antenna port (1,2), it is also possible to allocate the CSI-RSs to particular subcarriers of (l=5 and 6) in cell group A and particular subcarriers of (l=2 and 3) in cell group B. The frequency shift may be different according to the total number of antenna ports for all the allocated CSI-RSs or according to the number of all reuse factors required within one subframe. For example, if antenna ports for 8 CSI-RSs are allocated, it is possible to generate a total of three cell group-specific patterns, which are discriminated from each other, within one subframe.

If 8, 4, and 2 CSI-RS antenna ports are used, it is possible to generate 3, 6, and 12 discriminated cell group-specific patterns (reuse factors having the orthogonality) within one subframe, respectively, similarly to the preceding embodiments described above. Further, the construction capable of muting or blanking REs, to which CSI-RSs of another cell (cell group) are allocated, is also the same as that in the preceding embodiments described above.

The CSI-RSOCC allocation scheme according to the fifth embodiment of the present invention shown in FIG. 6 can be expressed by Equation 5 below. Equation 5 shows a representative example for helping the understanding of the present invention and may be expressed in another way within the range capable of maintaining the basic scheme described above.

$$\begin{aligned}
&CSI\text{-}RS \text{ antenna port} = 1,3,5,7: \; OCC \; [+1, +1] \quad \text{[Equation 5]}\\
&CSI\text{-}RS \text{ antenna port} = 2,4,6,8: \; OCC \; [+1, -1]\\
&k = 12 \cdot m + (v + v_{shift}) \bmod 12\\
&l = \begin{cases} 5,6 & \text{if } CSI\text{-}RS \text{ antenna port} = 1,2,3,4 \\ 2,3 & \text{if } CSI\text{-}RS \text{ antenna port} = 5,6,7,8 \end{cases}\\
&m = 0, 1, 2, \ldots, N_{RB}^{DL} - 1\\
&v = \begin{cases} 2 & \text{if } CSI\text{-}RS \text{ antenna port} = 1,2,5,6 \\ 8 & \text{if } CSI\text{-}RS \text{ antenna port} = 3,4,7,8 \end{cases}\\
&v_{shift} = N_{ID}^{cell} \bmod 3
\end{aligned}$$

In the fifth embodiment of the present invention shown in FIG. 6, two pairs of consecutive symbol axes (l=2/3 and 5/6) are used, CSI-RSs of antenna port Nos. (5, 6) and (1, 2) are allocated to locations where (l, k)=(2/3, 2) and (5/6, 2) and CSI-RSs of antenna port Nos. (7, 8) and (3, 4) are allocated to locations where (l, k)=(2/3, 7) and (5/6, 7) in cell group A, and CSI-RSs are allocated in the same pattern to locations of (k=3, 8), which are frequency shifted by +1, in cell group B.

In this event, the number of antenna ports, in which the CSI-RS is duplicately allocated to the same RE, and the sequence of the numbers of antenna ports in the frequency direction may change and are not limited to the embodiment shown in FIG. 6.

Further, the combination and the sequence of the antenna port numbers allocated to corresponding positions may be changed and may be set according to each cell.

Figure 7:
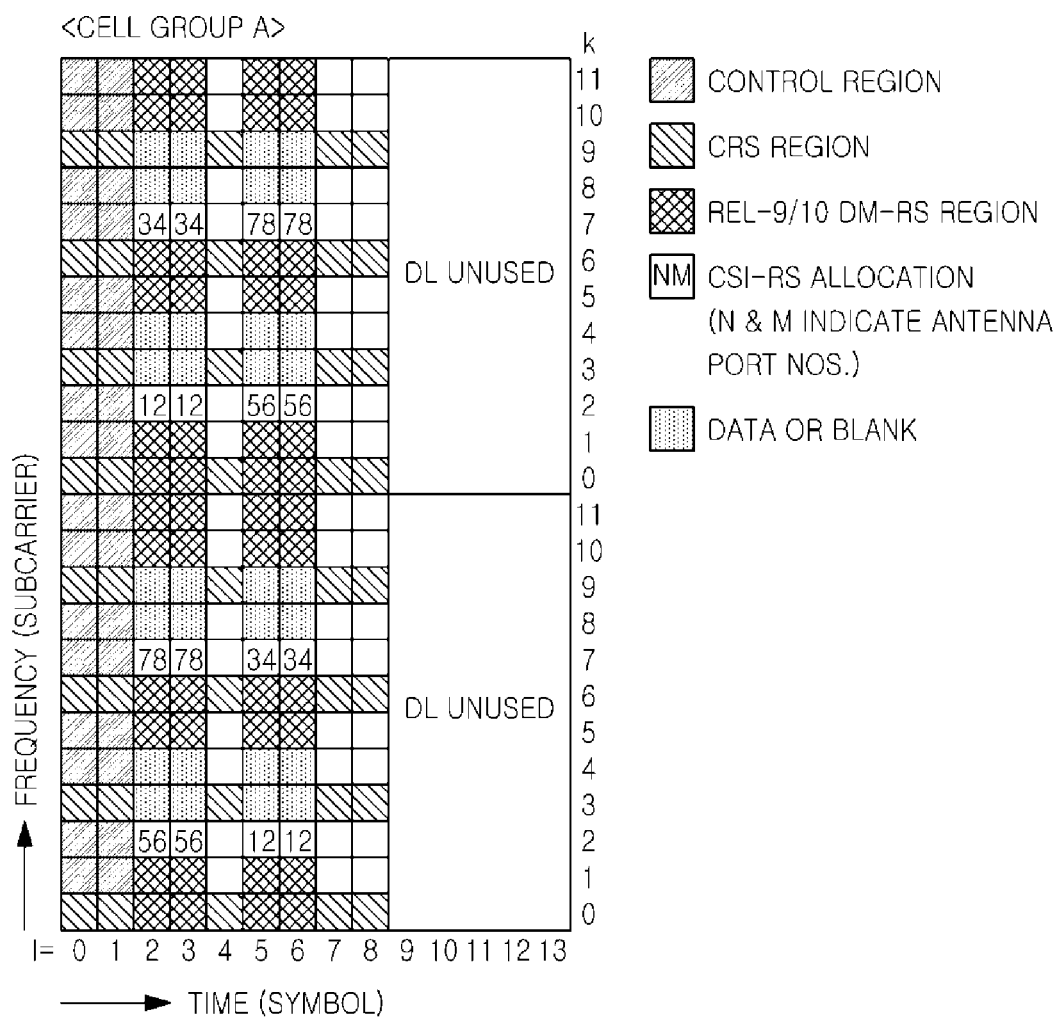
Figure 8:
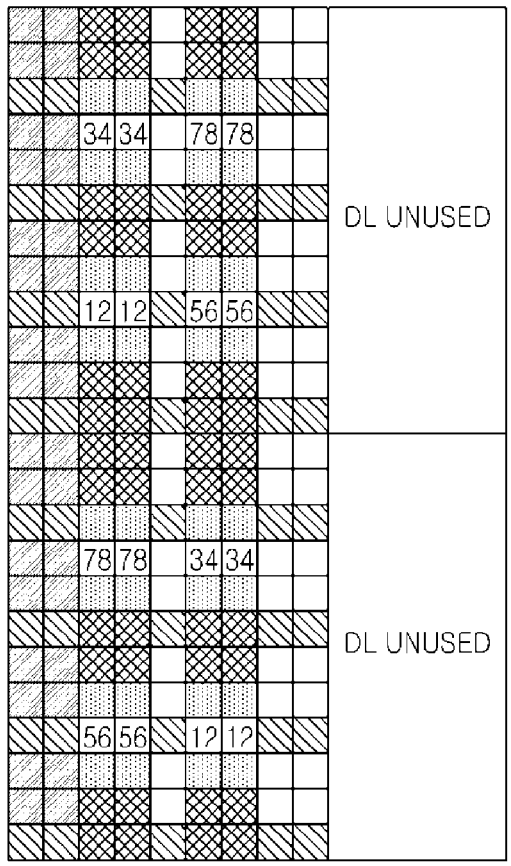
Figure 8:
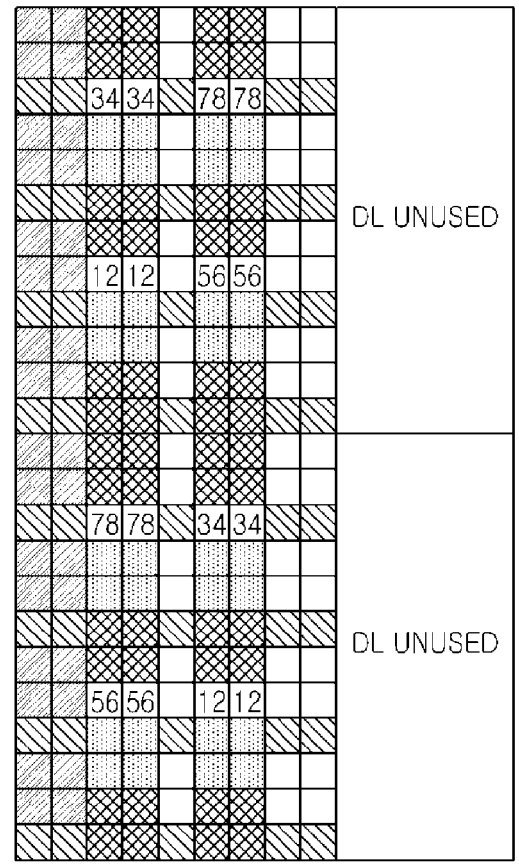

The fifth embodiment of the present invention as shown in FIG. 6 may be modified into a configuration for two Physical Resource Blocks (PRBs) as shown in FIGS. 7 and 8, in order to perform a PRB-bundling for full power utilization.

That is, referring to FIGS. 7 and 8, four symbols are used within one PRB. In this event, if first two symbols are used for antenna ports of antenna port Nos. 1, 2, 3, and 4 and the other two symbols are used for antenna ports of antenna port Nos. 5, 6, 7, and 8, CSI-RSs for antenna ports of antenna port Nos. 5, 6, 7, and 8 are allocated, in the following PRB (e.g. odd PRB), to the symbols, to which CSI-RSs for antenna ports of antenna port Nos. 1, 2, 3, and 4 have been allocated in the previous PRB (e.g. even PRB). In contrast, CSI-RSs for antenna ports of antenna port Nos. 1, 2, 3, and 4 are allocated to the symbols, to which CSI-RSs for antenna ports of antenna port Nos. 5, 6, 7, and 8 have been allocated in the previous PRB.

Figure 9:
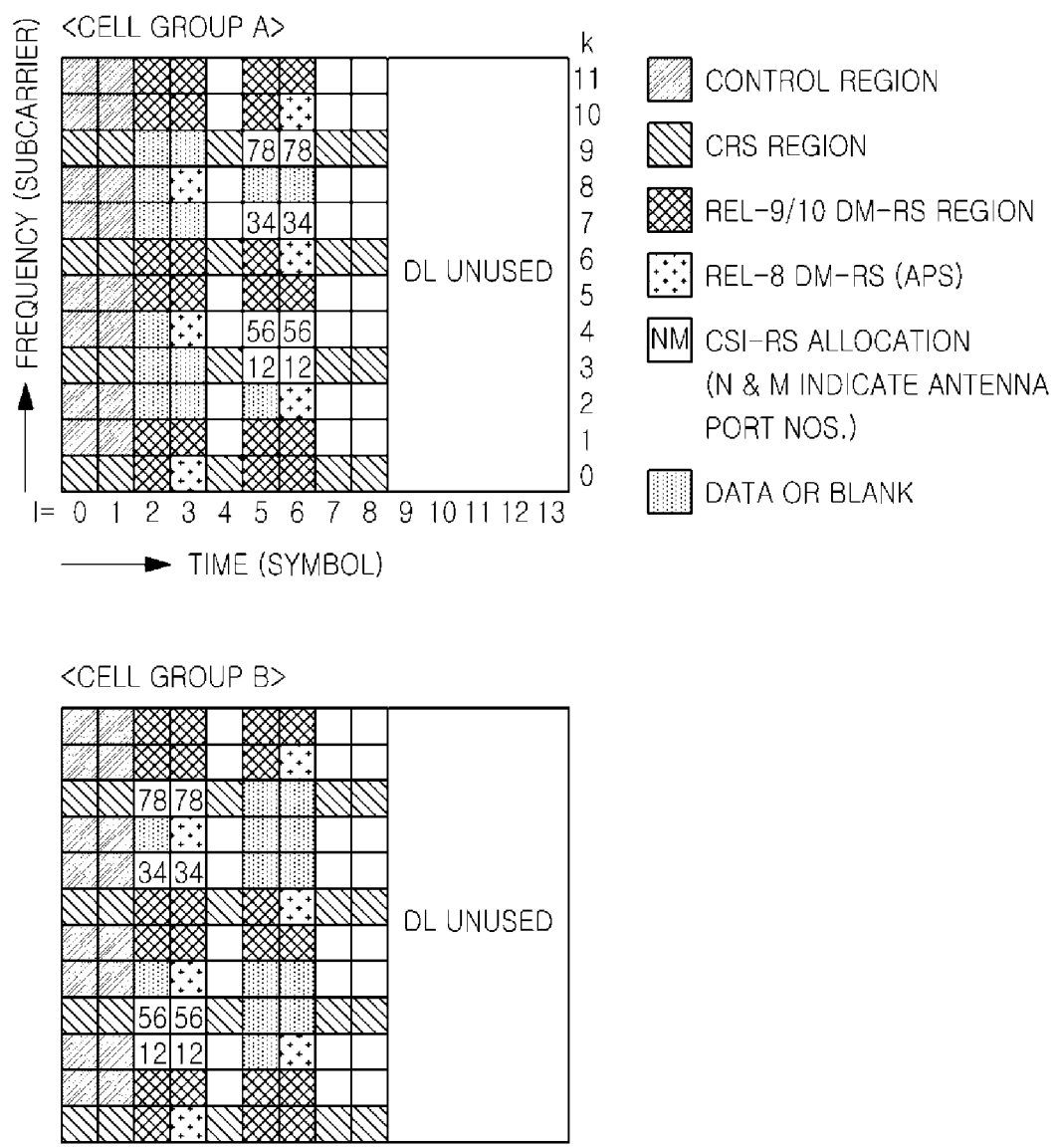

FIG. 9 shows a CSI-RS allocation scheme according to a sixth embodiment of the present invention, for a subframe in which the CP is a normal CP, the duplex scheme is TDD, and the number of OFDM symbols allocated to the downlink (DwPTS) within the subframe is 9 or 10. However, in the sixth embodiment of the present invention, duplicated allocation of AP5 is not allowed, differently from the fifth embodiment of the present invention.

In this event, the subframe is the special subframe as described above.

In the sixth embodiment of the present invention, whether to use AP2 or AP3 is not considered.

The following configuration is applied to the sixth embodiment of the present invention shown in FIG. 9.

Two consecutive OFDM symbols are used, and the CSI-RSs may be allocated to two different consecutive symbol axes according to the cell (or cell group).

It is the same as in the first embodiment of the present invention shown in FIG. 2 in view of that an antenna port is identified by an OCC code and the CSI-RSs are allocated to REs corresponding to one half of the number of antenna ports for each symbol in the second embodiment of the present invention.

CSI-RSs may be configured for a total of two basic cell groups discriminated from each other. In the first cell group, CSI-RSs are allocated to the 6th and 7th symbol axes (l=5, 6) and to the other REs except for the REs, at which AP5 and Rel-9/10 DM-RS are located, in the 6th and 7th symbol axes (l=5, 6). In the second cell group, CSI-RSs are allocated to the 3rd and 4th symbol axes (l=2, 3) and to the other REs except for the REs, at which AP5 and Rel-9/10 DM-RS are located, in the 3rd and 4th symbol axes (l=3, 4).

If 8 CSI-RS antenna ports are used, it is possible to generate two discriminated cell group-specific patterns (reuse factors having the orthogonality) within one subframe. Further, if 2 or 4 CSI-RS antenna ports are used, it is possible to generate a maximum of 8 or 4 discriminated cell group-specific patterns (reuse factors having the orthogonality) within one subframe. To this end, each cell group-specific CSI-RS pattern is shifted in the frequency and symbol axes. For example, antenna port (1, 2) is allocated to (l, k)=(5/6, 3) in cell group A while it is allocated to (l, k)=(2/3, 2) in cell group B, which corresponds to a shift of −3 in the frequency axis and a shift of −1 in the symbol axis between the cell groups.

That is, the number of all REs configured in order to generate each cell-specific pattern is a maximum of 16 (or two times of the number of antenna ports for allocated CSI-RSs) within one subframe, and the muting or blanking as described above may be applied.

The CSI-RS allocation scheme according to the sixth embodiment of the present invention shown in FIG. 9 can be expressed by Equation 6 below. Equation 6 shows a representative example for helping the understanding of the present invention and may be expressed in another way within the range capable of maintaining the basic scheme described above.

[Equation 6]

$$CSI\text{-}RS \text{ antenna port} = 1,3,5,7:\ OCC\ [+1, +1]$$
$$CSI\text{-}RS \text{ antenna port} = 2,4,6,8:\ OCC\ [+1, -1]$$
$$k = 12 \cdot m + (v + v_{shift}) \bmod 12$$
$$l = \begin{cases} 5,6 & \text{if } N_{ID}^{cell} \bmod 2 = 0 \\ 2,3 & \text{if } N_{ID}^{cell} \bmod 2 = 1 \end{cases}$$
$$m = 0, 1, 2, \ldots, N_{RB}^{DL} - 1$$
$$v = \begin{cases} 3 & \text{if } CSI\text{-}RS \text{ antenna port} = 1,2 \\ 7 & \text{if } CSI\text{-}RS \text{ antenna port} = 3,4 \\ 4 & \text{if } CSI\text{-}RS \text{ antenna port} = 5,6 \\ 9 & \text{if } CSI\text{-}RS \text{ antenna port} = 7,8 \end{cases}$$
$$v_{shift} = \begin{cases} -1 & \text{if } N_{ID}^{cell} \bmod 2 = 1 \text{ and } CSI\text{-}RS \text{ antenna port} = 1,2,5,6 \\ 0 & \text{else} \end{cases}$$

In conclusion, according to the sixth embodiment shown in FIG. 9, two consecutive cell group-specific symbol axes (l=5/6, 2/3) are used, wherein one cell group A may be shifted by +1 from the other cell groups B and C in the frequency axis.

Further, the combination and the sequence of the antenna port numbers allocated to corresponding positions may be changed and may be set according to each cell. Although FIG. 9 shows a scheme of allocating a combination of (1,2)+(5,6) to four neighbor REs while allocating (3,4) and (7,8) to spaced REs, the present invention is not limited to the scheme shown in FIG. 9 and may employ another combination or sequence.

FIG. 10 shows a CSI-RS allocation scheme according to a seventh embodiment of the present invention, for a downlink subframe in which the CP is an extended CP, the duplex scheme is FDD or TDD, and a duplicated allocation of AP5 is allowed (that is, CSI-RS allocation to the location of AP5 is allowed).

However, in the seventh embodiment of the present invention, the case in which AP2 or AP3 is not used is taken into account, which may differ from the preceding embodiments described above.

The following configuration is applied to the seventh embodiment of the present invention shown in FIG. 10.

Two consecutive OFDM symbols are used, which may include the 8th and the 9th symbols (i.e. l=7 and 8).

Every two antenna ports are tied into one pair, and the pairs are multiplexed by FDM while two consecutive OFDM symbols for two antenna ports within each pair are multiplexed by CDM (i.e. CDM-T) by using an orthogonal code such as the Orthogonal Cove Code (OCC), as in the embodiments described above.

Antenna ports for 2/4/8 CSI-RSs may be allocated to two symbols (if 3/5/7 antenna ports are allocated, addition of one more antenna port to the corresponding number of antenna ports is considered. That is, if 7 antenna ports are allocated, 8 antenna ports are considered for the CSI-RS configuration, which results in that the number of antenna ports is 8 and one half of the number of antenna ports being 4), and the CSI-RSs are allocated to REs corresponding to one half of the number of antenna ports for each symbol. For example, if antenna ports for 8 CSI-RSs are allocated, CSI-RSs for each antenna port are allocated to 4 REs (or subcarriers) in each symbol.

An interval of REs corresponding to "24/(number of antenna ports)" along the frequency axis is arranged between neighbor CSI-RS allocated REs for one symbol axis. For example, if antenna ports for 8 CSI-RSs are allocated, an interval of 3 REs along the frequency axis is established (which implies that 2 empty REs exist) between neighbor CSI-RS allocated REs for one symbol axis.

According to the cell group ID, a frequency shift may occur by the unit of a total of 12 subcarriers. In this event, based on the interval between neighbor CSI-RS allocated REs, it is possible to generate cell group-specific patterns (reuse factor having the orthogonality), which are discriminated from each other and correspond to a maximum of "24/(number of antenna ports)", within one subframe. In this event, for example, if antenna ports for 8 CSI-RSs are allocated, it is possible to generate a total of three cell group-specific patterns, which are discriminated from each other, within one subframe.

Among the REs, it is possible to perform the blanking, which empties the REs, to which another cell group except for its own cell group (the cell group to which the serving cell belongs) sends CSI-RSs, without sending data to the REs, or the muting, which performs the transmission using zero power.

The CSI-RS allocation scheme according to the seventh embodiment of the present invention shown in FIG. 10 as described above can be expressed by Equation 7 below. Equation 7 shows a representative example for helping the understanding of the present invention and may be expressed in another way within the range capable of maintaining the basic scheme described above.

$$CSI\text{-}RS \text{ antenna port} = 1,3,5,7: \; OCC \; [+1, +1] \quad \text{[Equation 7]}$$
$$CSI\text{-}RS \text{ antenna port} = 2,4,6,8: \; OCC \; [+1, -1]$$
$$k = 12 \cdot m + (v + v_{shift}) \bmod 12$$
$$l = 7,8$$
$$m = 0, 1, 2, \ldots, N_{RB}^{DL} - 1$$
$$v = \begin{cases} 0 & \text{if } CSI\text{-}RS \text{ antenna port} = 1,2 \\ 6 & \text{if } CSI\text{-}RS \text{ antenna port} = 3,4 \\ 3 & \text{if } CSI\text{-}RS \text{ antenna port} = 5,6 \\ 9 & \text{if } CSI\text{-}RS \text{ antenna port} = 7,8 \end{cases}$$
$$v_{shift} = N_{ID}^{cell} \bmod 12$$

In Equation 7, k indicates a subcarrier number, l indicates a symbol number, $N_{ID}^{cell}$ indicates a cell ID, and $N_{RB}^{CL}$ indicates the number of downlink RBs.

As described above, in the seventh embodiment of the present invention as shown in FIG. 10, CSI-RSs of antenna ports number (1,2), (5,6), (3,4), and (7,8) for CSI-RS are allocated to the locations where k=0, 3, 6, and 9, respectively, in the symbol axes of (l=7 and 8) in cell group A, CSI-RSs of antenna ports number (1,2), (5,6), (3,4), and (7,8) for CSI-RS are allocated to the locations where k=1, 4, 7, and 10, respectively, which are shifted by +1 along the frequency axis, in the same symbol axis in cell group B, and CSI-RSs of antenna ports number (1,2), (5,6), (3,4), and (7,8) for CSI-RS are allocated to the locations where k=2, 5, 8, and 10, respectively, in cell group C.

In this event, the number of the antenna port, in which the CSI-RS is duplicately allocated to the same RE, and the sequence of the numbers of antenna ports in the frequency direction may change and are not limited by the embodiment shown in FIG. 10. That is, in FIG. 10, as the index of the subcarrier increases, the allocation is performed in the sequence of (1,2), (5,6), (3,4), and (7,8). However, this is not a requirement and another antenna port combination or another sequence, such as the order of the antenna port number (1,2), (3,4), (5,6), and (7,8), may be employed for the allocation, if the index of the subcarrier increases or decreases. In other words, CSI-RSs of a higher antenna port number may be allocated to an RE having a lower subcarrier index. For example, CSI-RSs of the 7th and 8th antenna ports (antenna port Nos. 6 and 7) may be allocated to two REs having a subcarrier index within a RB of 0 (1st subcarrier), and CSI-RSs of the (5th, 6th), (3rd, 4th), (1st, 2nd) antenna ports (i.e. antenna port Nos. are (4, 5), (2, 3), and (0, 1), respectively) may be allocated to two REs having subcarrier indexes within a RB of 3, 6, and 9 (i.e. 4th, 7th and 10th subcarriers, respectively), respectively.

However, as shown in FIG. 10, antenna ports duplicately allocated to one RE may be neighbor antenna ports adjacent to each other. That is, in FIG. 10, the antenna ports duplicately allocated to (l, k)=(7/8, 0) may be antenna port 1 and antenna port 2, which are adjacent to each other.

However, the combination and the sequence of the antenna port numbers arranged in the frequency direction are not necessarily limited to FIG. 10, and another combination or sequence may be employed.

Figure 11:
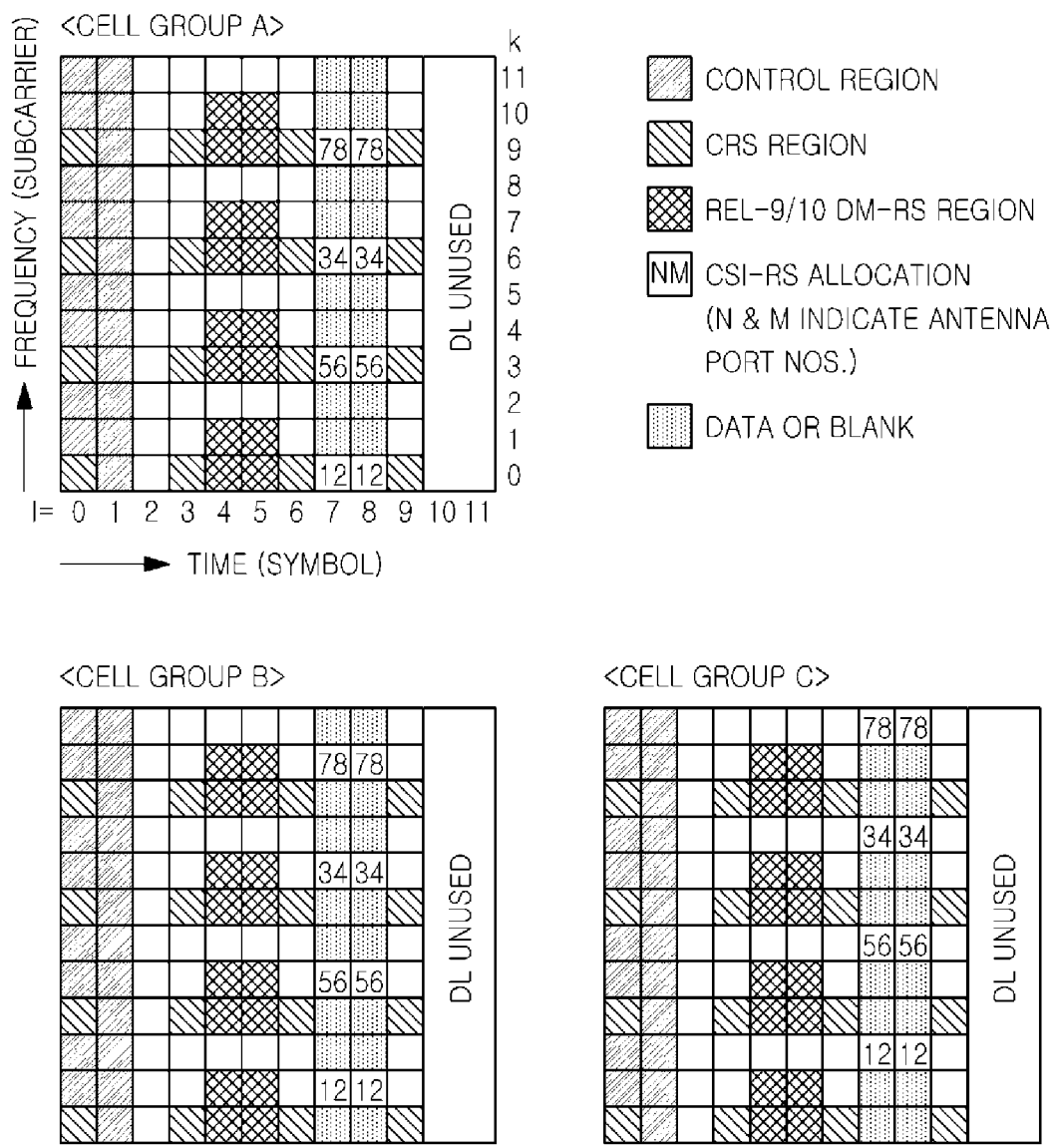

FIG. 11 shows a CSI-RS allocation scheme according to an eighth embodiment of the present invention, for a subframe in which the CP is an extended CP, the duplex scheme is TDD, the number of OFDM symbols for the downlink (DwPTS) within the subframe is 8 or 9/10, and a duplicated allocation of AP5 is allowed (that is, CSI-RS allocation to the location of AP5 is allowed).

Further, as in the seventh embodiment of the present invention, only the case in which AP2 or AP3 is not used is taken into account.

In this event, the subframe mentioned above corresponds to the special subframe.

The following configuration is applied to the eighth embodiment of the present invention shown in FIG. 11.

Two consecutive OFDM symbols are used. For example, the consecutive 8th and 9th OFDM symbol axes (l=7, 8) may be used if the number of OFDM symbols for the downlink (DwPTS) in the special subframe is 9 or 10, and the 3rd and 8th OFDM symbol axes (l=2, 7) may be used if the number of OFDM symbols for the downlink (DwPTS) in the special subframe is 8.

It is the same as in the preceding embodiments of the present invention described above in view of that an antenna port is identified by an OCC code and the CSI-RSs are allocated to REs corresponding to one half of the number of antenna ports for each symbol.

As in the preceding embodiments of the present invention described above, an interval of REs corresponding to "24/(number of antenna ports)" along the frequency axis is arranged between neighbor CSI-RSs allocated REs for one symbol axis. Also, according to the cell group ID, it is possible to generate cell group-specific patterns, which are discriminated from each other and correspond to a maximum of "24/(number of antenna ports)", within one subframe. Further, the construction capable of muting or blanking REs, to which CSI-RSs of another cell (or cell group) are allocated, is also similar to that in the preceding embodiments of the present invention.

The CSI-RS allocation scheme according to the eighth embodiment of the present invention shown in FIG. 11 can be expressed by Equation 8 below. Equation 8 shows a representative example for helping the understanding of the present invention and may be expressed in another way within the range capable of maintaining the basic scheme described above.

$$CSI\text{-}RS \text{ antenna port} = 1,3,5,7: \; OCC \; [+1, +1] \quad \text{[Equation 8]}$$
$$CSI\text{-}RS \text{ antenna port} = 2,4,6,8: \; OCC \; [+1, -1]$$
$$k = 12 \cdot m + (v + v_{shift}) \bmod 12$$
$$l = \begin{cases} 7,8 & \text{if in a special subframe with 9,10 OFDM symols} \\ 2,7 & \text{if in a special subframe with 8 OFDM symols} \end{cases}$$
$$m = 0, 1, 2, \ldots, N_{RB}^{DL} - 1$$

$$v = \begin{cases} 0 & \text{if } CSI\text{-}RS \text{ antenna port} = 1,2 \\ 6 & \text{if } CSI\text{-}RS \text{ antenna port} = 3,4 \\ 3 & \text{if } CSI\text{-}RS \text{ antenna port} = 5,6 \\ 9 & \text{if } CSI\text{-}RS \text{ antenna port} = 7,8 \end{cases}$$

$$v_{shift} = N_{ID}^{cell} \bmod 12$$

In the eighth embodiment of the present invention described above, if the number (DwPTS) of OFDM symbols used for the downlink within one subframe is 9 or 10, as shown in FIG. 11, CSI-RSs of (1,2), (5,6), (3,4), and (7,8) are allocated to the locations where k=0, 3, 6, and 9, respectively, in the symbol axes of (l=9 and 10) in cell group A, CSI-RSs of (1,2), (5,6), (3,4), and (7,8) are allocated to the locations where k=1, 4, 7, and 10, respectively, which are shifted by +1 along the frequency axis, in the same symbol axis in cell group B, and CSI-RSs of (1,2), (5,6), (3,4), and (7,8) are allocated to the locations where k=2, 5, 8, and 10, respectively, in cell group C.

In this event, the number of the antenna port, in which the CSI-RS is duplicately allocated to the same RE, and the sequence of the numbers of antenna ports in the frequency direction may change, and antenna ports duplicately allocated to a single RE are antenna ports adjacent to each other, as in the preceding embodiments described above.

In the first to eighth embodiments of the present invention, the number of reuse factors for one subframe, that is, the number of orthogonal patterns, which are discriminated according to cell groups, is 2 or 3, and is 3 in most cases.

In the case of using a subframe shift or an offset, the total reuse factor corresponds to "a reuse factor within one subframe×the number of subframes allocatable within one CSI-RS cycle". For example, if the reuse factor within one subframe is 3, the transmission cycle is 5 ms, and the number of allocatable subframes is 4 except for the subframe, to which the primary synchronization signal (PSS) and the secondary synchronization signal (SSS) are allocated, and the total reuse factor may be 12 (3*4=12).

Figure 12:
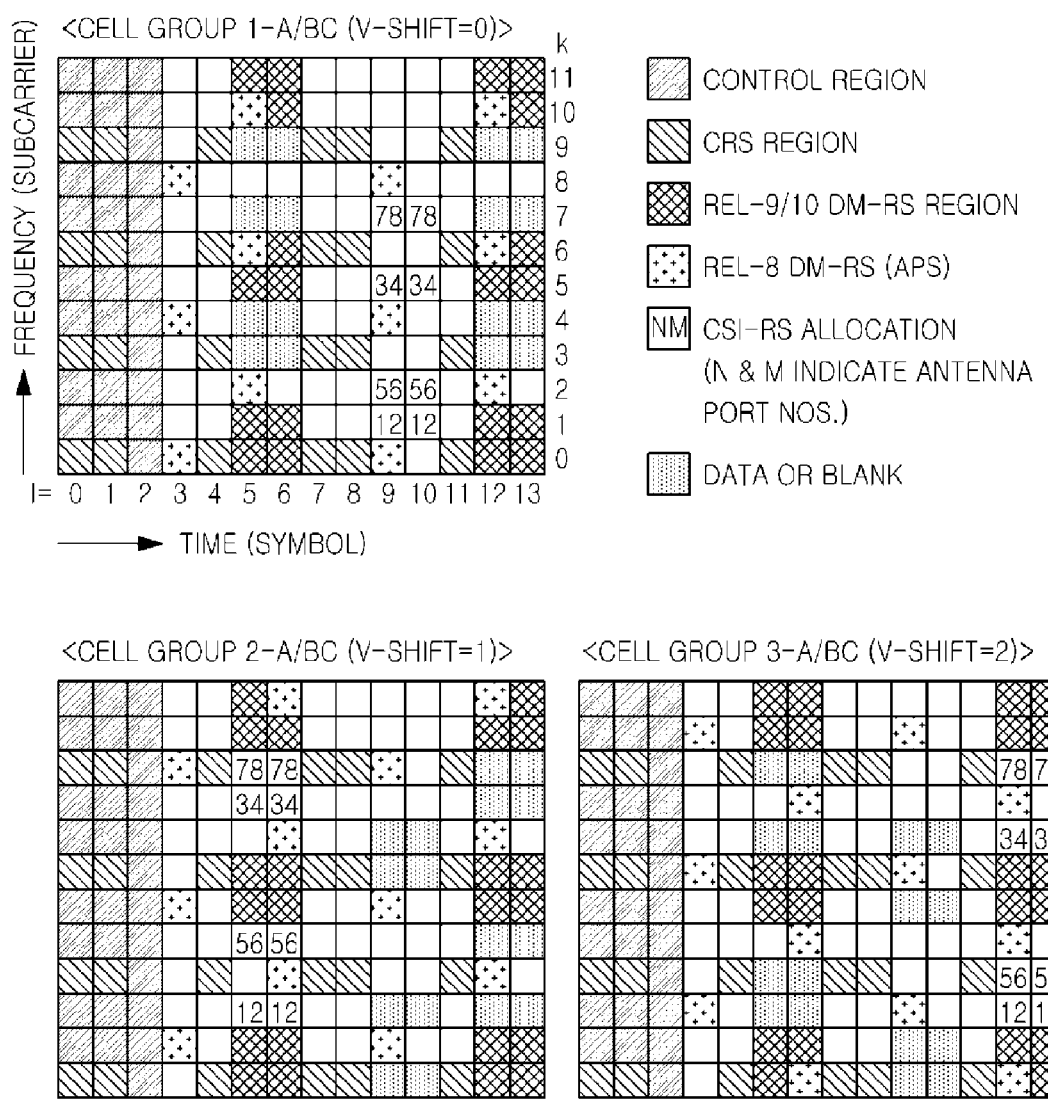
Figure 13:
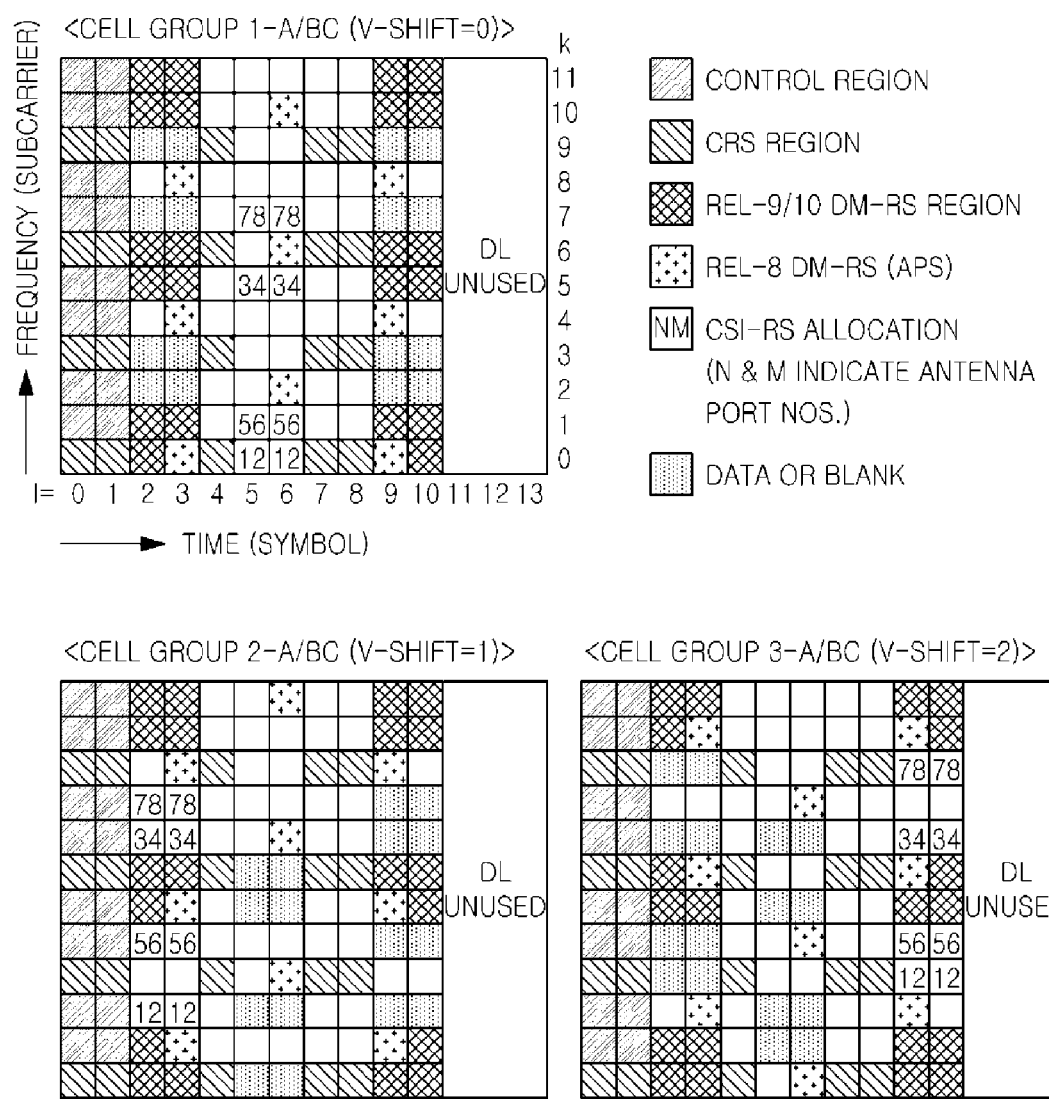
Figure 14:
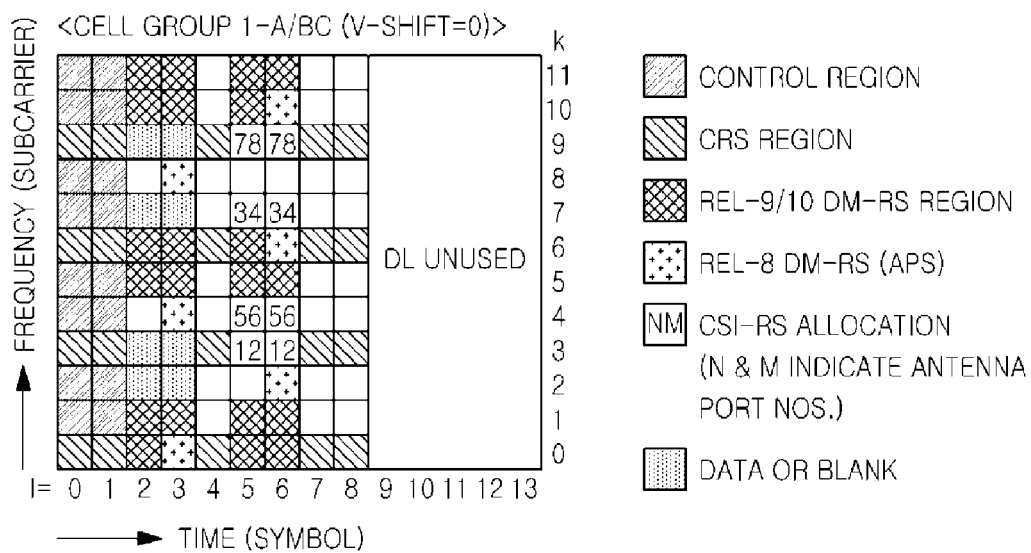
Figure 14:
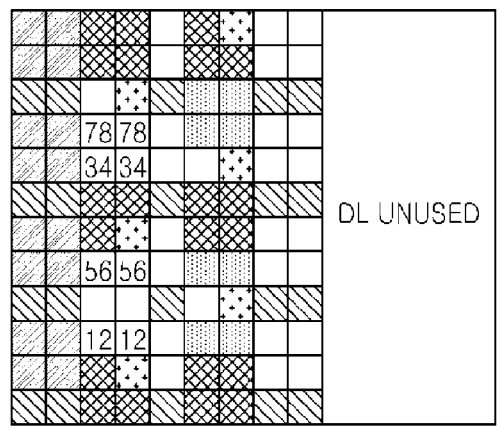
Figure 14:
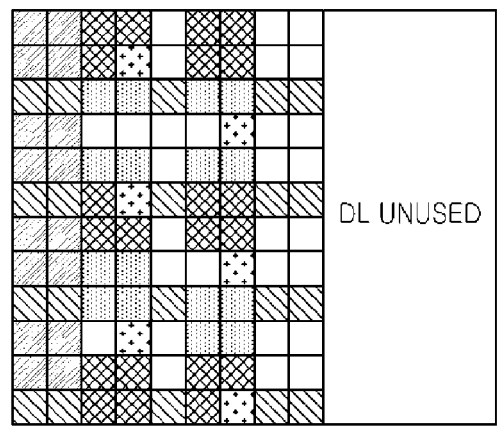

FIGS. 12, 13, and 14 illustrate CSI-RS allocation schemes additionally taking a frequency shift (v-shift) of AP5 into consideration to the embodiments shown in FIGS. 3, 5, and 9.

As described above, FIG. 3 shows a CSI-RS allocation scheme according to a second embodiment of the present invention, for a downlink subframe in which the CP is a normal CP and the duplex scheme is FDD or TDD. Further, in the CSI-RS allocation scheme shown in FIG. 3, a duplicated allocation of AP5 is not allowed, and whether to use AP2 or AP3 is not considered. Moreover, the mapping scheme in FIG. 3 does not take the frequency shift of AP5 into consideration, that is, corresponds to a scheme if v-shift=0. If the frequency shift of AP5 is taken into consideration, for example, if the v-shift=1 or 2, the CSI-RS allocation scheme according to a second embodiment of the present invention shown in FIG. 3 can be modified to that shown in FIG. 12.

The following configuration is applied to the CSI-RS allocation scheme shown in FIG. 12.

The CSI-RS allocation scheme without consideration of the v-shift is similar to the second embodiment shown in FIG. 3, so a detailed description thereof is omitted here.

Besides the three discriminated basic cell groups, three bundles of cell groups in relation to the frequency shift of AP may also be used. The three bundles of cell groups correspond to cases where v-shift=0, v-shift=1, and v-shift=2, respectively. For each of the v-shifts, three basic cell groups are correlated. For example, if the total cell groups include 9 groups, each bundle including three basic cell groups is related to the v-shift, and there are a total of three bundles of cell groups, each including three basic cell groups relating to the v-shifts, in relation to a total of three AP5s.

It may be possible to simply divide the total cell groups into three bundles of cell groups and then define just a single cell group within a bundle of three cell groups relating to the v-shift. That is, in FIG. 12, it is possible to select only one cell group from the three cell groups included in each of the cell group bundles 1, 2, and 3 relating to the v-shift.

As in the embodiments described above, when 8, 4, and 2 CSI-RS antenna ports are used, it is possible to generate 3, 6, and 9 perfectly discriminated cell group-specific patterns (reuse factors having the orthogonality) within one subframe, respectively. Further, the construction capable of muting or blanking REs, to which CSI-RSs of another cell (cell group) are allocated, is also the same as that in the first embodiment shown in FIG. 2. Moreover, the change in the number of antenna port, in which the CSI-RS is duplicately allocated to the same RE, and the sequence of the numbers of antenna ports in the frequency direction may be similar to that of the embodiments described above.

FIG. 13 illustrates a CSI-RS allocation scheme additionally taking a frequency shift (v-shift=0, 1, or 2) of AP5 into consideration to the fourth embodiment shown in FIG. 5.

The following configuration is applied to the CSI-RS allocation scheme shown in FIG. 13.

The basic configuration of the CSI-RS allocation scheme shown in FIG. 13 is similar to the fourth embodiment shown in FIG. 5, so a detailed description thereof is omitted here.

However, the embodiment shown in FIG. 13 is different from the fourth embodiment in that the CSI-RS allocation pattern corresponding to the second cell group is generated by shifting the CSI-RS allocation pattern corresponding to the first cell group by −3 in the OFDM symbol axis corresponding to time and by +2 in the subcarrier axis corresponding to frequency in the embodiment shown in FIG. 13 (however, the CSI-RS allocation pattern corresponding to the second cell group is generated by shifting the CSI-RS allocation pattern corresponding to the first cell group by −3 in the OFDM symbol axis corresponding to time and by −2 in the subcarrier axis corresponding to frequency the fourth embodiment).

Besides the three discriminated basic cell groups, three bundles of cell groups in relation to the frequency shift of AP5 may be used. As in the structure shown in FIG. 12, each of the three bundles of cell groups, each of which includes three basic cell groups among the total 9 cell groups, is related to the v-shift while preventing overlapping between the bundles.

Further, although FIG. 13 shows a scheme of allocating a combination of (1,2)+(5,6) to four neighbor REs while allocating (3,4) and (7,8) to spaced REs, the present invention is not limited to the scheme shown in FIG. 5 and may employ another combination or sequence.

FIG. 14 corresponds to the sixth embodiment of the present invention shown in FIG. 9 and illustrates a CSI-RS allocation scheme additionally taking a frequency shift (v-shift=0, 1, or 2) of AP5 into consideration.

The basic configuration of the CSI-RS allocation scheme shown in FIG. 14 is similar to the sixth embodiment shown in FIG. 9, so a detailed description thereof is omitted here.

However, in the embodiment shown in FIG. 13, besides the two discriminated basic cell groups shown in FIG. 9, three bundles of cell groups in relation to the frequency shift of AP5 may be used. The three bundles of cell groups correspond to the cases where v-shift=0, v-shift=1, and v-shift=2, respectively. For each of the v-shifts, two basic cell groups are correlated, as described above. For example, if the total cell groups are divided into 6 groups, each bundle including two basic cell groups is related to the v-shift, and there are a total of three bundles of cell groups, each including two basic cell groups relating to the v-shifts, in relation to a total of three AP5s.

It may be possible to simply divide the total cell groups into two bundles of cell groups and then define just a single cell group within each bundle of three cell groups relating to the v-shift. That is, in FIG. 14, it is possible to select only one cell group from the two cell groups included in each of the cell group bundles 1 and 2 relating to the v-shift.

Further, the number of the antenna port, in which the CSI-RS is duplicately allocated to the same RE, and the sequence of the numbers of antenna ports in the frequency direction may change according to the cells. In addition, although FIG. 14 shows a scheme of allocating a combination of (1,2)+(5,6) to four neighbor REs while allocating (3,4) and (7,8) to spaced REs, in a manner slightly different from that of FIG. 9, the present invention is not limited to the scheme shown in FIG. 5 and may employ another combination or sequence.

According to the embodiments of the present invention, it is possible to allocate CSI-RSs to resource areas, so as to enable each cell to have the orthogonality, according to whether it is possible to duplicately allocate a CSI-RS to antenna No. 5 (AP5) and in consideration of the subframe structure information including the CP length, Duplex scheme, and the number of symbols allocated to the downlink (DwPTS) in the case of TDD. Therefore, it is possible to transmit the CSI-RSs of antenna ports for multiple cells (cell groups) without interference.

Figure 15:
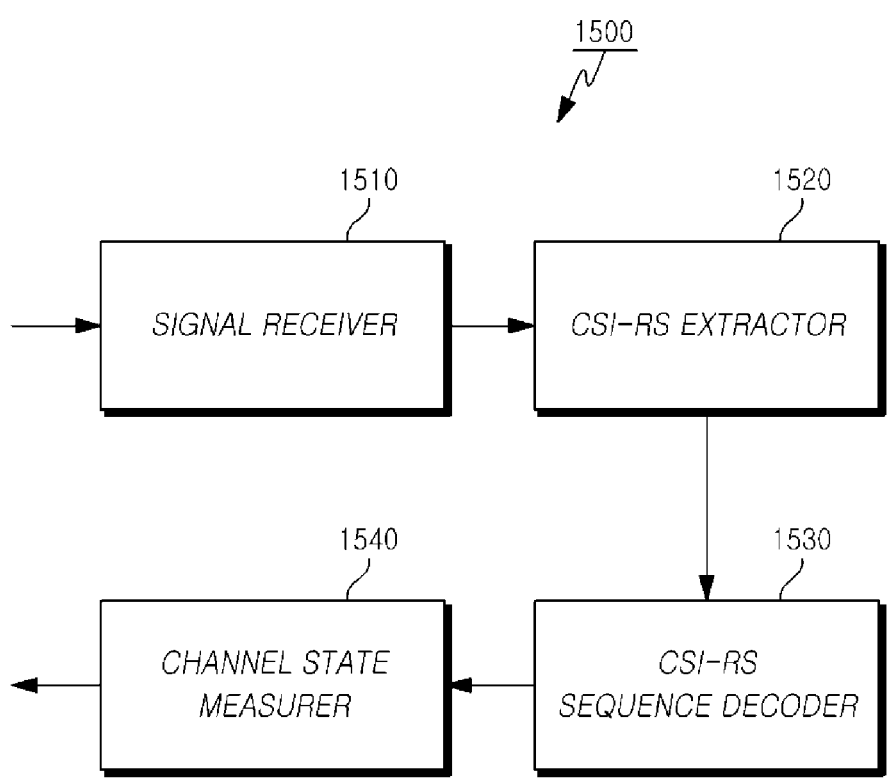
FIG. 15 is a block diagram illustrating a receiving apparatus to receive CSI-RSs according to an exemplary embodiment of the present invention.

FIG. 15 is a block diagram illustrating a receiving apparatus for receiving CSI-RSs transmitted according to a CSI-RS allocation and transmission scheme according to an exemplary embodiment of the present invention.

Referring to FIG. 15, the receiving apparatus 1500 of a UE in a wireless communication system includes a signal receiver 1510, a CSI-RS extractor 1520 which can be included a RE demapper, a CSI-RS sequence decoder 1530, and a channel state measurer 1540.

The signal receiver 1510 receives a signal through each antenna port of the receiving apparatus 1500, and the CSI-RS extractor 1520 extracts only the CSI-RSs for each of the multiple antenna ports allocated to particular REs from the received signal.

The CSI-RS sequence decoder 1530 decodes a CSI-RS sequence for each antenna port. The CSI-RS extractor 1520 and/or the CSI-RS sequence decoder may follow an inverse order to the CSI-RS allocation scheme according to one of the schemes described above with reference to FIGS. 2 to 14, and the channel state measurer 1540 acquires Channel Spatial Information (CSI), which is channel state information for each antenna port in a multiple antenna system including multiple antennas, through the de-mapped CSI-RSs.

Figure 16:
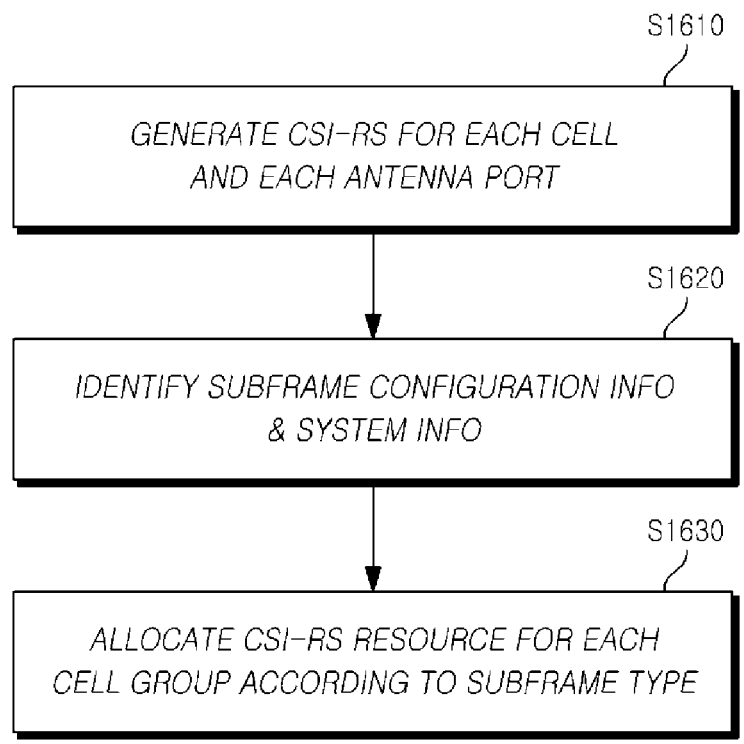
FIG. 16 is a flowchart illustrating a method for allocating CSI-RSs according to an exemplary embodiment of the present invention.

FIG. 16 is a flowchart illustrating a method of allocating CSI-RSs according to an embodiment of the present invention.

The method of allocating CSI-RSs according to an embodiment of the present invention includes the steps of: generating a CSI-RS for each cell (or cell group) and for each antenna port (step S1610); identifying subframe configuration information of a subframe allocated the CSI-RSs and system information including cell (or cell group) identification information (step S1620); and allocating CSI-RS of each antenna port to a resource area while enabling one or more cells (or cell groups) to have an orthogonality in the frequency/time resource by using the subframe configuration information and the system information (step S1630).

The subframe configuration information may include the CP length, the duplex scheme, and the number of OFDM symbols for the downlink (DwPTS) within a special subframe if the duplex scheme is TDD, and may further include information on whether to perform duplicated allocation of AP5 (i.e. whether to duplicately allocate CSI-RSs to a location at which the CRS of AP5 is allocated) in the allocation step.

In the step of allocating the CSI-RS (step S1630), the CSI-RSs of each cell (cell group) and for each antenna port are allocated to the time/frequency resource area according to the schemes described above with reference to FIGS. 2 to 14, in consideration of the subframe type determined by the identified subframe configuration information (including the CP length & duplex scheme) and existence or absence of duplicated resource allocation of AP5.

In this event, especially under the condition of a subframe as in the embodiment shown in FIG. 10, in which the CP is an extended CP, the duplex scheme is TDD, and a duplicated allocation to AP5 is allowed, if CSI-RSs for maximum 8 antenna ports are allocated, the CSI-RSs may be allocated to the 8th and 9th symbols (symbol number l=7 and 8), in such a manner that each CSI-RS for every two antenna ports is allocated to the same RE while being discriminated from each other by an orthogonal code and neighbor CSI-RSs allocated REs in the frequency axis are spaced by an interval of three REs.

The CSI-RS allocation schemes according to embodiments of the present invention as described above with reference to FIGS. 2 to 11 may be used under various conditions, a detailed description of which is omitted here in order to avoid repetition of description.

By using the embodiments described above, it may be possible to allocate CSI-RSs to a time-frequency resource area with securing a orthogonality between cells (cell groups) for each of various types of subframes while maintaining the CSI-RS transmission overhead. As a result, it may be possible to reduce the performance degradation due to interference between neighbor cells.

The embodiments of the present invention as described above provide an apparatus and a method for allocating CSI-RSs to resource areas, so as to enable cells to have the orthogonality, according to whether it is possible to duplicately allocate a CSI-RS to antenna No. 5 (AP5) and in consideration of the subframe structure information including the CP length, Duplex scheme, and the number of symbols allocated to the downlink (DwPTS) within a special subframe in the case of TDD. As a result, it is possible to reduce the performance degradation due to interference between neighbor cells in various types of subframe structures.

While the exemplary embodiments have been shown and described, it will be understood by those skilled in the art that various changes in form and details may be made thereto without departing from the spirit and scope of this disclosure as defined by the appended claims and their equivalents. Thus, as long as modifications fall within the scope of the appended claims and their equivalents, they should not be misconstrued as a departure from the scope of the invention itself.

What is claimed is:

1. A method for an apparatus comprising a processor for allocating Channel State Information-Reference Signals (CSI-RSs) for at lease two antenna ports in a wireless communication system that supports an extended Cyclic Prefix (CP) and a Time Division Duplex (TDD) mode, the method comprising:

allocating, by the processor, CSI-RSs of a first pair of antenna ports to a first two consecutive Resource Elements (REs) in a time-frequency resource area determined by one subframe and 12 subcarriers, the first two consecutive REs corresponding to one subcarrier in a frequency axis and 8th and 9th symbols in a time axis, and the one subframe having 12 symbols for the extended CP, wherein a CSI-RS of a first antenna port and a CSI-RS of a second antenna port in the first pair of antenna ports are configured to be discriminated from each other by orthogonal codes.

2. The method of claim 1, further comprising:
allocating, by the processor, CSI-RSs of a second pair of antenna ports to a second two consecutive REs in the time-frequency resource area, wherein the first two consecutive REs and the second two consecutive REs are spaced apart from each other along the frequency axis by having two subcarriers between the first two consecutive REs and the second two consecutive REs.

3. The method of claim 1, wherein CSI-RSs of the (7th, 8th), (5th, 6th), (3rd, 4th), (1st, 2nd) antenna ports are allocated to two consecutive REs having subcarrier indexes having 0, 3, 6, and 9 (1st, 4th, 7th and 10th subcarriers within a Resource Block, respectively), respectively.

4. The method of claim 1, wherein the first antenna port and the second antenna port in the first pair of antenna ports have consecutive antenna port numbers.

5. The method of claim 1, wherein the orthogonal codes include two orthogonal cover codes (OCCs),
wherein a first OCC has a value of 1 mapped to the 8th symbol and a value of 1 mapped to the 9th symbol, and a second OCC has a value of 1 mapped to the 8th symbol and a value of −1 mapped to the 9th symbol.

6. A method for an apparatus comprising a signal receiver to receive Channel State Information-Reference Signals (CSI-RSs), the method comprising:

receiving, by the signal receiver, an Orthogonal Frequency Division Multiplexing (OFDM) signal, which is generated through allocation of CSI-RSs for at least two antenna ports in a wireless communication system that supports an extended Cyclic Prefix (CP) and a Time Division Duplex (TDD) mode;

extracting CSI-RSs for antenna ports allocated to particular Resource Elements (REs) from the received signal; and acquiring Channel State Information (CSI) based on the extracted CSI-RSs, wherein CSI-RSs of a first pair of antenna ports are allocated to a first two consecutive REs in a time-frequency resource area determined by one subframe and 12 subcarriers, the first two consecutive REs corresponding to one subcarrier in a frequency axis and 8th and 9th symbols in a time axis, and the one subframe having 12 symbols for the extended CP, and a CSI-RS of a first antenna port and a CSI-RS for a second antenna port in the first pair of antenna ports are configured to be discriminated from each other by orthogonal codes.

7. The method of claim 6, wherein CSI-RSs of a second pair of antenna ports are allocated to a second two consecutive REs in the time-frequency resource area, wherein the first two consecutive REs and the second two consecutive REs are spaced apart from each other along the frequency axis by having two subcarriers between the first two consecutive REs and the second two consecutive REs.

8. The method of claim 6, wherein CSI-RSs of the (7th, 8th), (5th, 6th), (3rd, 4th), (1st, 2nd) antenna ports are allocated to two consecutive REs having subcarrier indexes having 0, 3, 6, and 9 (1st, 4th, 7th and 10th subcarriers within a Resource Block, respectively), respectively.

9. The method of claim 6, wherein the first antenna port and the second antenna port in the first pair of antenna ports have consecutive antenna port numbers.

10. The method of claim 6, wherein the orthogonal codes include two orthogonal cover codes (OCCs),
wherein a first OCC has a value of 1 mapped to the 8th symbol and a value of 1 mapped to the 9th symbol, and a second OCC has a value of 1 mapped to the 8th symbol and a value of −1 mapped to the 9th symbol.

11. An apparatus, comprising:
a processor configured to allocate Channel State Information-Reference Signals (CSI-RSs) for at least two antenna ports in a wireless communication system that supports an extended Cyclic Prefix (CP) and a Time Division Duplex (TDD) mode, wherein CSI-RSs of a first pair of antenna ports are allocated to a first two consecutive Resource Elements (REs) in a time-frequency resource area determined by one subframe and 12 subcarriers, the first two consecutive REs corresponding to one subcarrier in a frequency axis and 8th and 9th symbols in a time axis, and the one subframe having 12 symbols for the extended CP, and a CSI-RS of a first antenna port and a CSI-RS of a second antenna port in the first pair of antenna ports are configured to be discriminated from each other by different orthogonal codes.

12. The apparatus of claim 11,
wherein the processor allocates CSI-RSs of a second pair of antenna ports to a second two consecutive REs in the time-frequency resource area, and wherein the first two consecutive REs and the second two consecutive REs are spaced apart from each other along the frequency axis by having two subcarriers between the first two consecutive REs and the second two consecutive REs.

13. The apparatus of claim 11, wherein CSI-RSs of the (7th, 8th), (5th, 6th), (3rd, 4th), (1st, 2nd) antenna ports are allocated to two consecutive REs having subcarrier indexes having 0, 3, 6, and 9 (1st, 4th, 7th and 10th subcarriers within a Resource Block, respectively), respectively.

14. The apparatus of claim 11, wherein the first antenna port and the second antenna port in the first pair of antenna ports have consecutive antenna port numbers.

15. The apparatus of claim 11, wherein the orthogonal codes include two orthogonal cover codes (OCCs),
wherein a first OCC has a value of 1 mapped to the 8th symbol and a value of 1 mapped to the 9th symbol, and a second OCC has a value of 1 mapped to the 8th symbol and a value of −1 mapped to the 9th symbol.

16. An apparatus to receive Channel State Information-Reference Signals (CSI-RSs), the apparatus comprising:

a signal receiver to receive an Orthogonal Frequency Division Multiplexing (OFDM) signal, which is generated through allocation of CSI-RSs for at least two antenna ports in a wireless communication system that supports an extended Cyclic Prefix (CP) and a Time Division Duplex (TDD) mode;
a CSI-RS extractor to extract CSI-RSs for antenna ports allocated to particular Resource Elements (REs) from a signal received by the signal receiver; and
a channel state measurer to acquire Channel State Information (CSI) based on the extracted CSI-RSs,
wherein CSI-RSs of a first pair of antenna ports are allocated to a first two consecutive REs in a time-frequency resource area determined by one subframe and 12 subcarriers, the first two consecutive REs corresponding to one subcarrier in a frequency axis and 8th and 9th symbols in a time axis, and the one subframe having 12 symbols for the extended CP, and
a CSI-RS of a first antenna port and a CSI-RS for a second antenna port in the first pair of antenna ports are discriminated from each other by orthogonal codes.

17. The apparatus of claim 16, wherein CSI-RSs of a second pair of antenna ports are allocated to a second two consecutive REs in the time-frequency resource area, wherein the first two consecutive REs and the second two consecutive REs are spaced apart from each other along the frequency axis by having two subcarriers between the first two consecutive REs and the second two consecutive REs.

18. The apparatus of claim 16, wherein CSI-RSs of the (7th, 8th), (5th, 6th), (3rd, 4th), (1st, 2nd) antenna ports are allocated to two consecutive REs having subcarrier indexes having 0, 3, 6, and 9 (1st, 4th, 7th and 10th subcarriers within a Resource Block, respectively), respectively.

19. The apparatus of claim 16, wherein the first antenna port and the second antenna port in the first pair of antenna ports have consecutive antenna port numbers.

20. The apparatus of claim 16, wherein the orthogonal codes include two orthogonal cover codes (OCCs),
wherein a first OCC has a value of 1 mapped to the 8th symbol and a value of 1 mapped to the 9th symbol, and a second OCC has a value of 1 mapped to the 8th symbol and a value of −1 mapped to the 9th symbol.

* * * * *